(12) United States Patent
Togashi et al.

(10) Patent No.: US 7,196,897 B2
(45) Date of Patent: *Mar. 27, 2007

(54) MULTILAYER CAPACITOR

(75) Inventors: Masaaki Togashi, Chuo-ku (JP); Taisuke Ahiko, Nikaho-machi (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/433,358

(22) Filed: May 15, 2006

(65) Prior Publication Data

US 2006/0203425 A1 Sep. 14, 2006

Related U.S. Application Data

(62) Division of application No. 10/527,023, filed as application No. PCT/JP03/011490 on Sep. 9, 2003, now Pat. No. 7,075,774.

(30) Foreign Application Priority Data

Sep. 10, 2002 (JP) ............................. 2002-264821
Sep. 10, 2002 (JP) ............................. 2002-264822

(51) Int. Cl.
*H01G 4/228* (2006.01)
(52) U.S. Cl. ............................. 361/306.3; 361/306.1; 361/321.1; 361/311; 361/313; 361/303; 361/308.1
(58) Field of Classification Search ............. 361/306.3, 361/306.1, 311–313, 321.1, 321.2, 308.1, 361/303–305, 328

See application file for complete search history.

(56) References Cited

U.S. PATENT DOCUMENTS

| | | | |
|---|---|---|---|
| 4,470,096 A | 9/1984 | Guertin | |
| 4,947,286 A | 8/1990 | Kaneko et al. | |
| 5,099,387 A | 3/1992 | Kato et al. | |
| 5,812,363 A * | 9/1998 | Kuroda et al. | ............ 361/306.3 |
| 5,815,367 A | 9/1998 | Asakura et al. | |
| 5,880,925 A | 3/1999 | DuPre et al. | |
| 5,894,401 A | 4/1999 | Asakura et al. | |
| 6,097,581 A | 8/2000 | Anthony | |
| 6,240,621 B1 * | 6/2001 | Nellissen et al. | ........... 29/602.1 |
| 6,252,177 B1 * | 6/2001 | Stoddard | ..................... 174/260 |
| 6,327,134 B1 | 12/2001 | Kuroda et al. | |
| 6,441,459 B1 | 8/2002 | Togashi et al. | |
| 6,525,628 B1 | 2/2003 | Ritter | |
| 6,570,210 B1 * | 5/2003 | Sowlati et al. | .............. 257/307 |
| 6,762,925 B2 * | 7/2004 | Uchida et al. | ........... 361/321.1 |

(Continued)

FOREIGN PATENT DOCUMENTS

JP A 57-157128 3/1982

(Continued)

*Primary Examiner*—Nguyen T. Ha
(74) *Attorney, Agent, or Firm*—Oliff & Berridge, PLC

(57) ABSTRACT

A first inner conductor, a second inner conductor, a first inner conductor, and a second inner conductor are disposed in the order mentioned from the top in the dielectric element. The first inner conductors are respectively led out to two opposing side surfaces of the dielectric element. A pair of the second inner conductors is respectively led out to two opposing side surfaces different from the two opposing side surfaces to which the first inner conductors are respectively led out. Terminal electrodes are respectively disposed on four side surfaces of the dielectric element for connection with these four inner conductors respectively.

8 Claims, 22 Drawing Sheets

U.S. PATENT DOCUMENTS 7,075,774 B2 * 7/2006 Togashi et al. .......... 361/306.3

FOREIGN PATENT DOCUMENTS

| JP | A 63-117416 | 5/1988 |
| --- | --- | --- |
| JP | A 11-144996 | 5/1999 |
| JP | A 11-340080 | 12/1999 |
| JP | A 2000-021676 | 1/2000 |
| JP | A 2000-357624 | 12/2000 |
| JP | A 2001-284171 | 10/2001 |
| JP | A 2002-151349 | 5/2002 |
| JP | A 2002-231559 | 8/2002 |

* cited by examiner

I:DRIVING ELECTRIC CURRENT OF CPU
Ic:DISCHARGE OF ELECTRIC CURRENT FROM CAPACITOR
Iv:ELECTRIC CURRENT FROM POWER SOURCE

C: CAPACITANCE
ESR: EQUIVALENT SERIAL RESISTANCE
ESL: EQUIVALENT SERIAL INDUCTANCE

MULTILAYER CAPACITOR

This is a Division of application Ser. No. 10/527,023 filed Mar. 8, 2005 now U.S. Pat. No. 7,075,774, which in turn is a National Stage Application of International Application No. PCT/JP03/011490 filed Sep. 9, 2003. The disclosure of the prior applications is incorporated by reference herein in its entirety.

TECHNICAL FIELD

The present invention relates to a multilayer capacitor wherein the equivalent serial inductance (ESL) is substantially reduced, more particularly, one suitable for a multilayer ceramic capacitor used for a decoupling capacitor.

BACKGROUND ART

Recently, CPU (central processing unit) used for information processing device, along with an improvement of a processing speed and a high integration, operating frequencies has become high and consumptive electricity has become remarkably increased. Together with above, the operating voltages tend to decrease as the consumptive electricity decreases.

Accordingly, power source supplying electricity to CPU develops higher and larger current fluctuations. Therefore, it became extremely difficult to suppress the voltage fluctuation due to the current fluctuation within the permissible level of the power source.

Therefore, as shown in FIG. 18, multilayer capacitor 100 called decoupling capacitor connected to the power source 102 is being frequently used for a power source stabilizing measures. And when at a transitional change of the power source due to its high speed, by quick charge and discharge of electricity, electric current is supplied to CPU 104 from this multilayer capacitor 100 to suppress the voltage fluctuation of power source 102.

However, along with a tendency to become higher frequency of the operating frequencies at CPU of today, the current fluctuations become higher and larger. And that the equivalent serial inductance (ESL) of multilayer capacitor 100 as shown in FIG. 18 is becoming to greatly influence the voltage fluctuation of power source.

In other words, at conventional multilayer capacitor 100 used for power supply circuit of CPU 104 as shown in FIG. 18 indicates high ESL, a parasitic component of equivalent circuit as shown in FIG. 18, therefore, together with electric current fluctuations I as shown in FIG. 19, the ESL will obstruct the charge and discharge of electricity of multilayer capacitor 100. Accordingly, same with above, voltage fluctuations V of power source tend to become large as shown in FIG. 19, and are increasingly becoming unable to sufficiently handle the higher speed of CPU in the future.

This is because the voltage fluctuations at a transmittal time of electric current when at charge and discharge of electricity closely resemble the following equation 1 and unevenness of the ESL is related to the size of voltage fluctuations.

$$dV = ESL \cdot di/dt \qquad \text{equation 1}$$

Here, dV is voltage fluctuation (V) at transmittal time, I is fluctuant amount of electric current (A), and t is fluctuant time (second).

Conventional multilayer capacitor as shown in FIG. 21 has a structure of the following. Pairs of ceramic layers 112A respectively including 2 kinds of internal conductors 114 and 116 as shown in FIG. 22 are alternately laminated to be dielectric body 112. The 2 kinds of internal conductors 114 and 116 respectively led out toward two facing side surfaces 112B, 112C of dielectric body 112 and respectively connected to terminal electrodes 118, 120 arranged at the outer part of dielectric body 112.

DISCLOSURE OF THE INVENTION

Considering the above factors of the invention, an object of the present invention is to provide a multilayer capacitor wherein ESL is substantially decreased.

In order to achieve the above object, multilayer capacitor according to the first object of the invention is, a multilayer capacitor wherein a plural number of internal conductors are respectively disposed between dielectric sheets in dielectric body formed by laminating a plural number of dielectric sheets, wherein the internal conductors comprising;

at least a pair of first internal conductors respectively led out toward two facing side surfaces of dielectric sheets, and at least a pair of second internal conductors respectively led out toward two facing side surfaces of the dielectric sheets different from the two facing side surfaces where said first internal conductors are led out, wherein the second internal conductor is arranged between a pair of the first internal conductors intervening said dielectric sheets, and the first internal conductor is arranged between a pair of the second internal conductors intervening said dielectric sheets.

Multilayer capacitor according to the first object of the invention comprises a plural number of internal conductors disposed between dielectric sheets in dielectric body formed by laminating a plural number of dielectric sheets. Moreover, a pair of the first internal conductors is respectively led out toward two facing side surfaces of dielectric body and a pair of the second internal conductors is respectively led out toward two facing side surfaces of the dielectric body different from the two facing side surfaces where said first internal conductors are led out.

Namely, the abovementioned plural number of internal conductors are comprising pairs of the first internal conductors and the pairs of the second internal conductors. And in between pairs of the first internal conductors and pairs of the second internal conductors, there exists one internal conductor between pairs of the other internal conductors.

For instance, pairs of the first internal conductors become mutually homopolar by disposing a second internal conductor in between, and the pairs of the first internal conductor are respectively led out toward two facing side surfaces of the dielectric body. Therefore, in the pairs of the first internal conductors, electric currents start to pass mutually in the opposite direction. On the other, in the pairs of the second internal conductors, electric currents start to pass mutually in the opposite direction.

Accordingly, it brings about an action to cancel the magnetic field not only by electric currents passing in the opposite direction between the pairs of the first internal conductors, but by the electric currents passing in the opposite direction between the pairs of the second internal conductors. Together with an occurrence of action to cancel the magnetic field, parasitic inductances of multilayer capacitor can be reduced and effect to reduce the equivalent serial inductance begins.

In these circumstances, according to the multilayer capacitor of the first object of the invention, the multilayer capacitor is attempted for a substantial reduce of ESL and that as an attenuation amount at a high frequency range increases, the voltage fluctuations of power source become possible to be suppressed. Namely, multilayer capacitor according to the first object of the invention is preferably used as a decoupling capacitor in CPU power supply circuit.

Preferably, multilayer capacitor according to the first object of the invention having at least a pair of first terminal electrodes arranged at two facing side surfaces of the dielectric body and respectively connected to a pair of the first internal conductors, and a pair of second terminal electrodes arranged at two facing side surfaces of the dielectric body, different from the two facing side surfaces wherein said first internal conductors are arranged, and respectively connected to a pair of the second internal conductors.

In this case, mutually facing pairs of the first terminal electrodes are connected to the outer portion of the multilayer capacitor wherein a pair of the first terminal electrodes are mutually homopolar. Mutually facing pairs of the second terminal electrodes are also connected to the outer portion of the multilayer capacitor wherein a pair of the second terminal electrodes is mutually homopolar. Consequently, as pairs of the first internal conductors become mutually homopolar, pairs of the second internal conductors become mutually homopolar. Therefore, acts of the multilayer capacitor as in the first object of the invention may further be affected without fail.

Preferably, at least one of said first internal conductor and said second internal conductor comprises a plural number of segmented conductors alternately led out toward two facing side surfaces of the dielectric body segmented in the way that the conductors extend in parallel form.

Namely, electric currents flow in the opposite direction in a plural pairs of segmented conductors that are a pair of the first internal conductors respectively segmented. Further, electric currents flow in the opposite direction in a plural pairs of segmented conductors that are a pair of the second internal conductors respectively segmented. As a result, not only bringing about an action to cancel the magnetic field between internal conductors arranged in the laminated direction, but by the flow of electric currents in the opposite directions in adjoining segmented conductors extending mutually in a line in a plain, it also bring about an action to cancel the magnetic field.

As a result, together with an occurrence of action to cancel the magnetic field between these segmented conductors, parasitic inductances of multilayer capacitor can further be reduced and effect to reduce the equivalent serial inductance further begins.

Preferably, mutually adjoining said segmented conductors arranged in a plane are respectively connected to said terminal electrode respectively arranged two facing side surfaces. Accordingly, directions of the electric currents flowing respectively in adjoining conductors become opposite.

Preferably, lead parts respectively connected to the first terminal electrode and the second terminal electrode are formed in the first internal conductor and the second internal conductor. The width of lead part may be the same, smaller, or larger with the width of the first internal conductor and/or the second internal conductor.

Preferably, a lead part connected to the terminal electrode is formed in segmented conductor. At least 3 segmented conductors are arranged in a plane. Then, 2 of the 3 segmented conductors arranged in every other segmented conductor are connected through said lead part. By the abovementioned composition, the flow of electric currents in the adjoining segmented conductors in a plane become opposite.

Preferably, width of the lead parts arranged in a plane facing each other are nearly the same. By making width of the lead parts nearly the same, connection with the terminal electrode can be done without fail.

Preferably, a planar shape of the segmented conductor is not particularly limited and may be rectangle, triangle, trapezoid or any other form, however, to obtain larger capacitance with the limited size, it is preferably rectangle triangle, or trapezoid.

Multilayer capacitor according to the second object of the invention is, a multilayer capacitor wherein a plural number of internal conductors are respectively disposed between dielectric sheets in dielectric body formed by laminating a plural number of dielectric sheets, characterized in that
the internal conductors comprising at least a pair of first internal conductors respectively led out toward two facing side surfaces of dielectric sheets, and at least a pair of second internal conductors respectively led out toward two facing side surfaces of the dielectric sheets different from the two facing side surfaces where said first internal conductors are led out, wherein the second internal conductor is arranged between a pair of the first internal conductors intervening said dielectric sheets, the first internal conductor is arranged between a pair of the second internal conductors intervening said dielectric sheets, the first internal conductor comprises a plural number of segmented conductors wherein the conductors are segmented to extend mutually in a row and are alternately led out toward two facing side surfaces of dielectric body, and the first internal conductors mutually adjoining in the laminated direction disposing the second internal conductor in between are arranged to superpose upon each other when observed from planner view, the segmented conductors that superpose upon each other are alternately led out toward the opposite directions.

Multilayer capacitor according to the second object of the invention is effective in below mentioned actions in addition to the actions of the multilayer capacitor according to the first object of the invention. Namely, two segmented conductors of the adjoining first internal conductor in the laminated direction disposing the second internal conductor in between become mutually homopolar and moreover, flows of electric currents become different direction. Further, electric currents start to flow in the opposite direction in mutually adjoining segmented conductors in a plane.

Accordingly, electric currents flow in the opposite direction in segmented conductors in the first internal conductor arranged in the laminated direction. Electric currents also flow in the opposite direction in a pair of the second internal conductor. Therefore, abovementioned electric currents respectively bring about an action to cancel the magnetic field. Further, electric currents start to flow in the opposite direction in mutually adjoining segmented conductors in a plane and that it bring about an action to cancel the magnetic field.

As a result, together with an occurrence of action to cancel the magnetic field between these conductors, parasitic inductances of multilayer capacitor can be reduced and effect to reduce the equivalent serial inductance begins.

According to the second object of the invention, the second internal conductor, may be segmented as in the first internal conductor, or not segmented.

Multilayer capacitor according to the second object of the invention having;

a plural pairs of the first terminal electrodes respectively connected to a plural number of segmented conductors and are respectively led out toward two facing side surfaces of the dielectric body, a pair of the second terminal electrodes respectively connected to a pair of the second internal conductor and respectively led out toward two facing side surfaces of dielectric body different from two facing side surfaces where plural pairs of the first terminal electrodes are led out.

By forming these terminal electrodes on the side surfaces of dielectric body, together with the segmented conductors composing the first internal conductor become homopolar without fail, a pair of the second internal conductor mutually become homopolar without fail.

According to the first and the second objects of the invention, concrete shape of the dielectric body is not particularly limited but preferably in a shape of rectangular parallelepiped. Namely, dielectric sheets are respectively shaped in a quadrilateral form such as rectangle and by laminating the dielectric sheets, dielectric body is shaped in rectangular parallelepiped form.

According to the first and the second objects of the invention, preferably, plural pairs of the first and the second internal conductors are arranged in the laminated direction respectively in said dielectric body. In this case, not only capacitance of multilayer capacitor increases, effect to cancel the magnetic field further increases and that inductances substantially decreases and ESL further decreases.

BRIEF DESCRIPTION OF THE DRAWINGS

The present invention will be described in detail from the description of the preferred embodiments given with reference to the attached drawings, wherein.

DESCRIPTION OF THE PREFERRED EMBODIMENTS

First Embodiment

Figure 1:
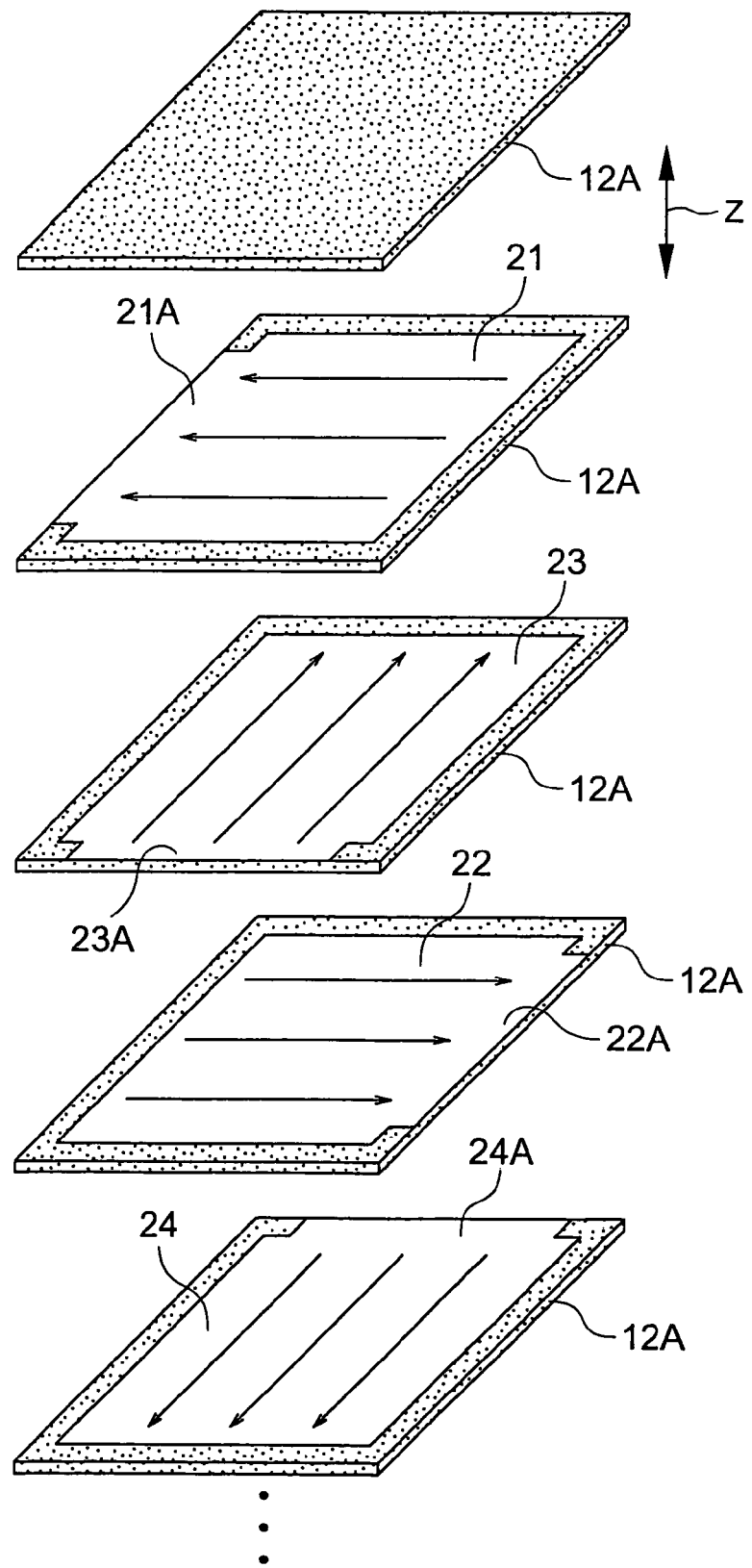
FIG. 1 is a broken down perspective view of multilayer capacitor according to the first embodiment of the invention.

Multilayer ceramic capacitor (only mentioned "Multilayer capacitor" from here) 10 according to the present embodiment is shown in FIG. 1 to 4. As shown in these figures, the multilayer capacitor 10 comprises a main portion of dielectric body 12 which is a rectangular parallelepiped sintered body obtained by firing multilayer body wherein a plural number of ceramic green sheet of dielectric sheets are laminated. In the dielectric body 12, the first internal conductor 21, the second internal conductor 23, the first internal conductor 22 and the second internal conductor 24 each forming approximate square (may be rectangle) are arranged from the top in the order, and between each pairs of internal conductors, ceramic layers 12A are respectively arranged.

Figure 3:
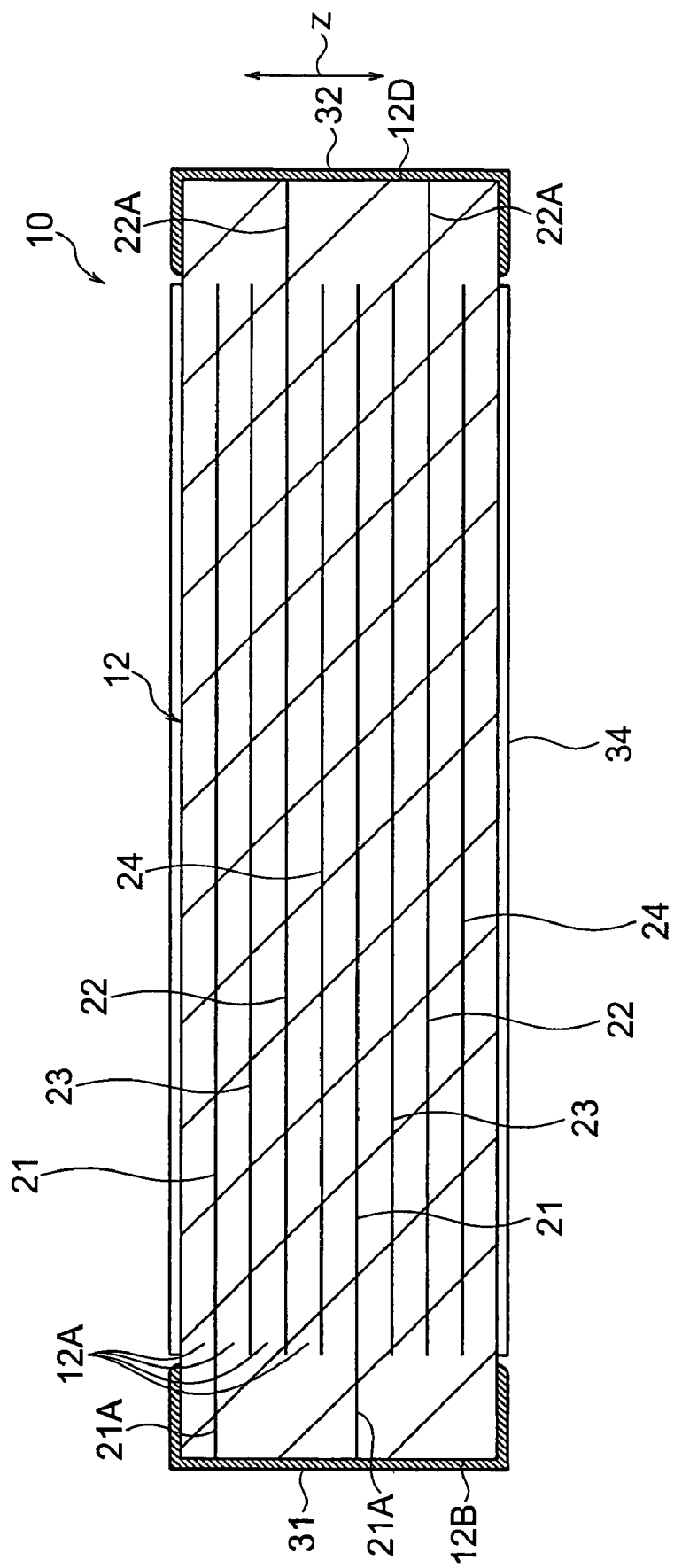
FIG. 3 is a sectional view of FIG. 2 taken along the line III—III.

In the present embodiment, ceramic layers 12A that are dielectric sheets after firing are respectively disposed between each internal conductors, and in the dielectric body 12, 4 kinds of internal conductors 21, 23, 22, and 24 are arranged in the order. Underneath the internal conductor 24, as shown in FIG. 3, in the same way as mentioned above, these 4 kinds of internal conductors 21, 23, 22, and 24 are repeatedly laminated. In example as shown in FIG. 3, two sets in total are arranged in the dielectric body 12 wherein a set comprises 4 kinds of internal conductors 21, 23, 22, and 24.

As the materials of these internal conductors 21 to 24, not only base metal materials such as Nickel, Nickel alloy, copper, or copper alloy can be used but materials comprising said metals as main component may also be considered.

Figure 2:
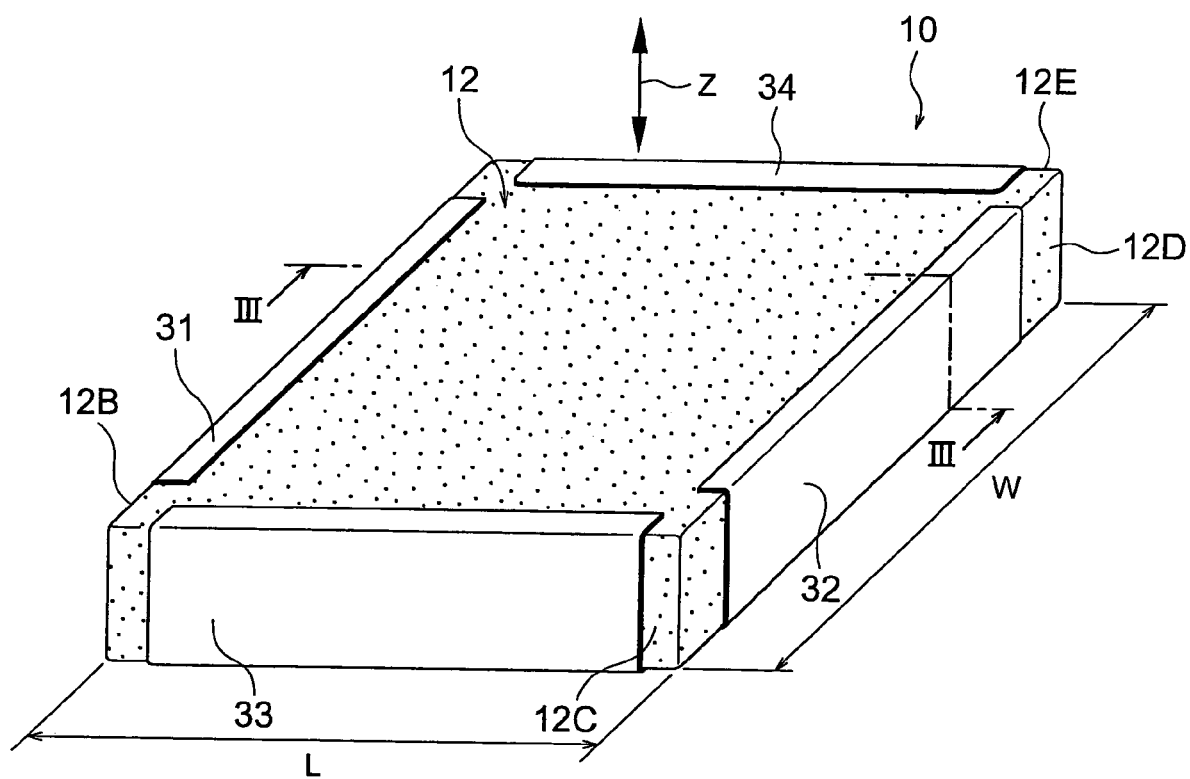
FIG. 2 is a perspective view of multilayer capacitor shown in FIG. 1.

As shown in FIG. 1 to 3, at the left side part of the first internal conductor 21, a lead part 21A led out toward left side surface 12B (shown in FIG. 2) of dielectric body 12 is formed. The internal conductor 21 is extended from the side surface 12B, where the lead part is led out, toward the facing side surface 12D (shown in FIG. 2) and will not be led out toward the side surfaces 12C, 12D, or 12E except for the side surface 12B. A plane form of the first internal conductor 21 except for a lead part 21A is a square or parallelepiped form slightly smaller than the plane form of ceramic layer 12A. In this embodiment, width of the lead part 21A is smaller than that of the first internal conductor 21.

On front side of the second internal conductor 23 arranged through ceramic layer 12A underneath the first internal conductor 21, a lead part 23A led out toward front side 12C (shown in FIG. 2) of dielectric body 12 is formed. This internal conductor 23 is extended from the led out side surface 12C toward the facing side surface 12E (shown in FIG. 2) and not led out by side surfaces 12B, 12D, or 12E but the side surface 12C. A plane form of the second internal conductor 23 except for a lead part 23A is a square or parallelepiped form slightly smaller than the plane form of ceramic layer 12A. In this embodiment, width of the lead part 23A is smaller than that of the second internal conductor 23.

On right side of the first internal conductor 22 arranged through ceramic layer 12A underneath the second internal conductor 23, a lead part 22A led out toward right side 12D (shown in FIG. 2) of dielectric body 12 is formed. This internal conductor 22 is extended from the led out side surface 12D toward the facing side surface 12B (shown in FIG. 2) and not led out by side surfaces 12B, 12C, or 12E but the side surface 12D. A plane form of the first internal conductor 22 except for a lead part 22A is a square or parallelepiped form slightly smaller than the plane form of ceramic layer 12A. In this embodiment, width of the lead part 22A is smaller than that of the first internal conductor 22.

On back side of the second internal conductor 24 arranged through ceramic layer 12A underneath the first internal conductor 22, a lead part 24A led out toward back side 12E (shown in FIG. 2) of dielectric body 12 is formed. This internal conductor 24 is extended from the led out side surface 12E toward the facing side surface 12C (shown in FIG. 2) and not led out by side surfaces 12B, 12C, or 12D but the side surface 12E. A plane form of the second internal conductor 24 except for a lead part 24A is a square or parallelepiped form slightly smaller than the plane form of ceramic layer 12A. In this embodiment, width of the lead part 24A is smaller than that of the first internal conductor 22.

Namely, as shown in FIGS. 1 and 3, the second internal conductor 23 is arranged between a pair of the first internal conductors 21 and 22, then, the first internal conductor 22 is arranged between a pair of the second internal conductors 23 and 24. And underneath the internal conductor 24, same with above, 4 kinds of internal conductors 21, 23, 22 and 24 as shown in FIG. 3, are arranged in the order.

According to the present embodiment, the first internal conductors 21 and 22 are respectively led out toward two facing side surfaces 12B and 12D of dielectric body 12. The second internal conductors 23 and 24 are respectively led out toward two facing side surfaces 12C and 12E different from the two side surfaces 12B and 12D where the first internal conductors 21 and 22 are led out. Namely, branch portions 21A, 23A, 22A and 24A of these 4 kinds of internal conductors 21, 23, 22 and 24 are respectively arranged at 4 side surfaces of dielectric body 12 in order not to lie on each other when reflected in the laminated direction shown by arrow Z as in FIG. 1 and FIG. 2.

In order to connect branch portion 21A of internal conductor 21, the first terminal electrode 31 as shown in FIG. 2 and FIG. 3 is connected to outer part of dielectric body 12 at side surface 12B of dielectric body 12. Further, in order to connect to lead part 22A of internal conductor 22, the first terminal electrode 32 is provided at the outer part of dielectric body 12 at side surface 12D of dielectric body 12.

Further, in order to connect to branch portion 23A of internal conductor 23, the second terminal electrode 33 is provided at the outer part of dielectric body 12 at side surface 12C of dielectric body 12. In order to connect to branch portion 24A of internal conductor 24, the second terminal electrode 34 is provided at the outer part of dielectric body 12 at side surface 12E of dielectric body 12.

Namely, in the present embodiment, a pair of the first internal electrodes 31 and 32 are respectively arranged at two facing side surfaces 12B and 12D of dielectric body 12. Further, a pair of the second terminal electrodes 33 and 34 is respectively arranged at two facing side surfaces 12C and 12E that are different from the two facing side surfaces 12B and 12D where terminal electrodes 31 and 32 are arranged.

Figure 4:
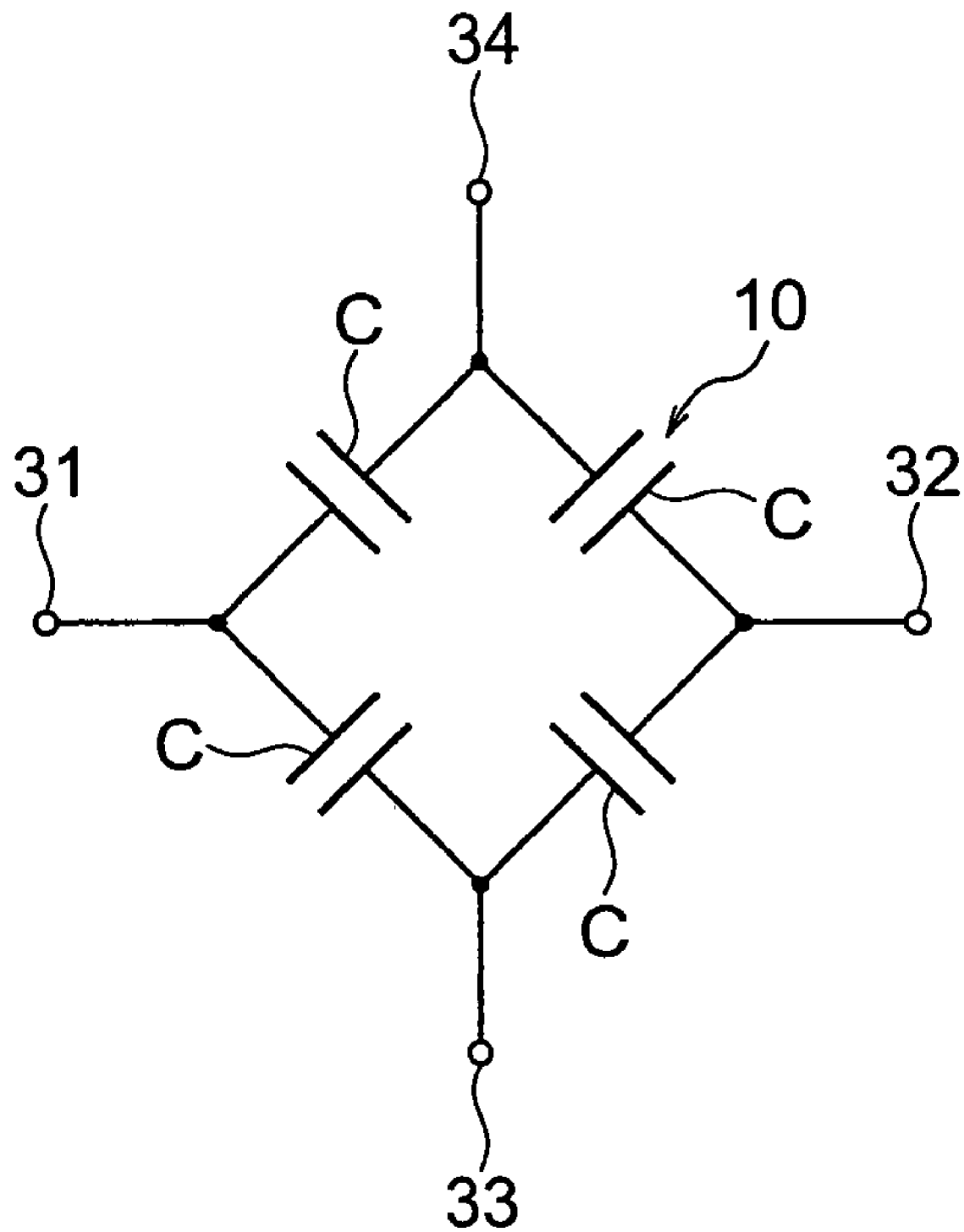
FIG. 4 is an equivalent circuit diagram of multilayer capacitor shown in FIG. 1.

In the present embodiment, internal conductors 21 to 24 composes mutually facing electrodes of capacitor and terminal electrodes 31 to 34 connected to these internal conductors 21 to 24 at side surfaces 12B to 12E of multilayer capacitor are arranged to compose equivalent circuit as shown in FIG. 4. Accordingly, multilayer capacitor 10 of the present embodiment has a composition where terminal electrodes 31 to 34 are respectively arranged at all 4 side surfaces 12B to 12E of dielectric body 12 in the shape of hexahedron form of a rectangular parallelepiped.

Next, actions of multilayer capacitor 10 of the present embodiment is described.

According to multilayer capacitor 10 of the present embodiment, a plural number of internal conductors are respectively arranged in the form of being disposed between ceramic layers 12A in dielectric body 12 in shape of a rectangular parallelepiped form wherein a plural number of dielectric sheets respectively becoming said ceramic layer 12A are laminated.

Further, a pair of internal conductors 21 and 22 are respectively led out from the two facing side surfaces 12B and 12D of dielectric body 12 and a pair of the internal conductors 23 and 24 are respectively led out toward two facing side surfaces 12C and 12E different from the two facing side surfaces 12B and 12D where a pair of internal conductors 21 and 22 are led out.

Namely, the above-mentioned plural number of internal conductors are comprising a pair of internal conductors 21, 22 and a pair of internal conductors 23, 24. In the present embodiment, the second internal conductor 23 is arranged between the first internal conductors 21 and 22 and the first internal conductor 22 is arranged between the second internal conductors 23 and 24.

Further, in the present embodiment, a pair of the first terminal electrodes 31 and 32 respectively arranged at two facing side surfaces 12B and 12D of dielectric body 12 are respectively connected to the abovementioned a pair of the first internal conductors 21 and 22. Further, a pair of the second terminal electrodes 33 and 34 respectively arranged at two facing side surfaces 12C and 12E, different from the side surfaces 12B and 12D where the first terminal electrodes 31 and 32 are arranged, are respectively arranged at the abovementioned pair of the second internal conductors 23 and 24.

Namely, a pair of internal conductors 21 and 22 are respectively led out toward two facing side surfaces 12B and 12D of dielectric body 12 and respectively connected to a pair of mutually facing terminal electrodes 31 and 32. Moreover, as mentioned above, the second internal conductor 23 is disposed between these first internal conductors 21 and 22. In order to function as capacitor, a pair of terminal electrodes 31 and 32 is connected to wiring or so at outer part of multilayer capacitor 10 in order that the electrodes have mutually homopolar characteristic. As a result, in this pair of internal conductors 21 and 22, as shown in FIG. 1 with arrows, electric currents pass in opposite direction and a pair of the first internal conductors 21 and 22 becomes mutually homopolar.

On the other, at a pair of the second internal conductors 23 and 24, a pair of mutually facing second terminal electrodes 33 and 34 is connected to wiring or so at outer part of multilayer capacitor 10 in order that the electrodes have mutually homopolar characteristic. Accordingly, in this pair of the second internal conductors 23 and 24, as shown in FIG. 1 with an arrow, by the same reason, electric currents pass in opposite directions and a pair of internal conductors 23 and 24 becomes mutually homopolar.

Accordingly, by electric currents flow in the opposite direction in a pair of internal conductors 21 and 22, not only bringing about an action to cancel the magnetic field, but by electric flows in the opposite direction in a pair of internal conductors 23 and 24, it brings about an action to cancel the magnetic field. And with the action to cancel the magnetic field between these internal conductors, parasitic inductances of multilayer capacitor 10 can be reduced then, it will be effective to reduce equivalent serial inductance (ESL).

Considering above, multilayer capacitor 10 according to the present embodiment, it is preferably used as decoupling capacitor and substantial reduce of ESL of multilayer capacitor 10 can be achieved. And according to multilayer capacitor 10 of the present embodiment, together with an improvement in an attenuation amount at a high frequency range, it becomes possible to suppress the voltage fluctuations of power supply and is preferably used in CPU power supply circuit.

Further, by arranging a plural pairs of the first internal conductors 21 and 22 and the second internal conductors 23 and 24, not only capacitance of multilayer capacitor 10 according to the present embodiment increases but also an action to cancel magnetic field further increases and inductance are substantially reduced and ESL is further reduced.

Manufacturing method of multilayer capacitor 10 according to the present embodiment, by laminating dielectric sheets that are in quadrilateral form such as rectangular parallelepiped, dielectric body 12 can be formed in rectangular parallelepiped form. As a result, in the present embodiment, lead parts of internal conductors 21 to 24 is formed at all side surfaces 12B to 12E of dielectric body 12 in shape of rectangular parallelepiped form that the capacitor of the embodiment uses its ability to the full to reduce ESL.

The Second Embodiment

Figure 5:
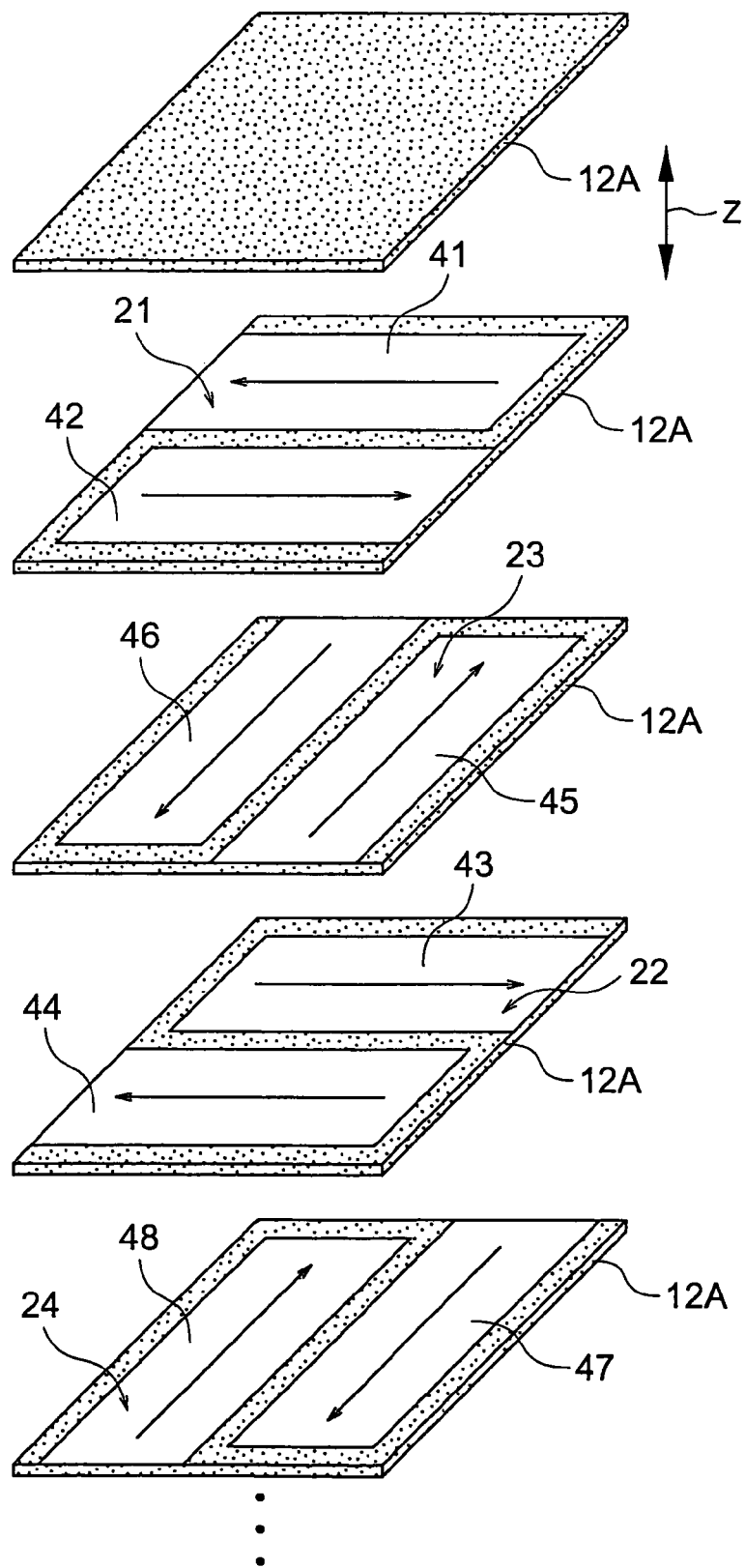
FIG. 5 is a broken down perspective view of multilayer capacitor according to the other embodiment of the invention.
Figure 6:
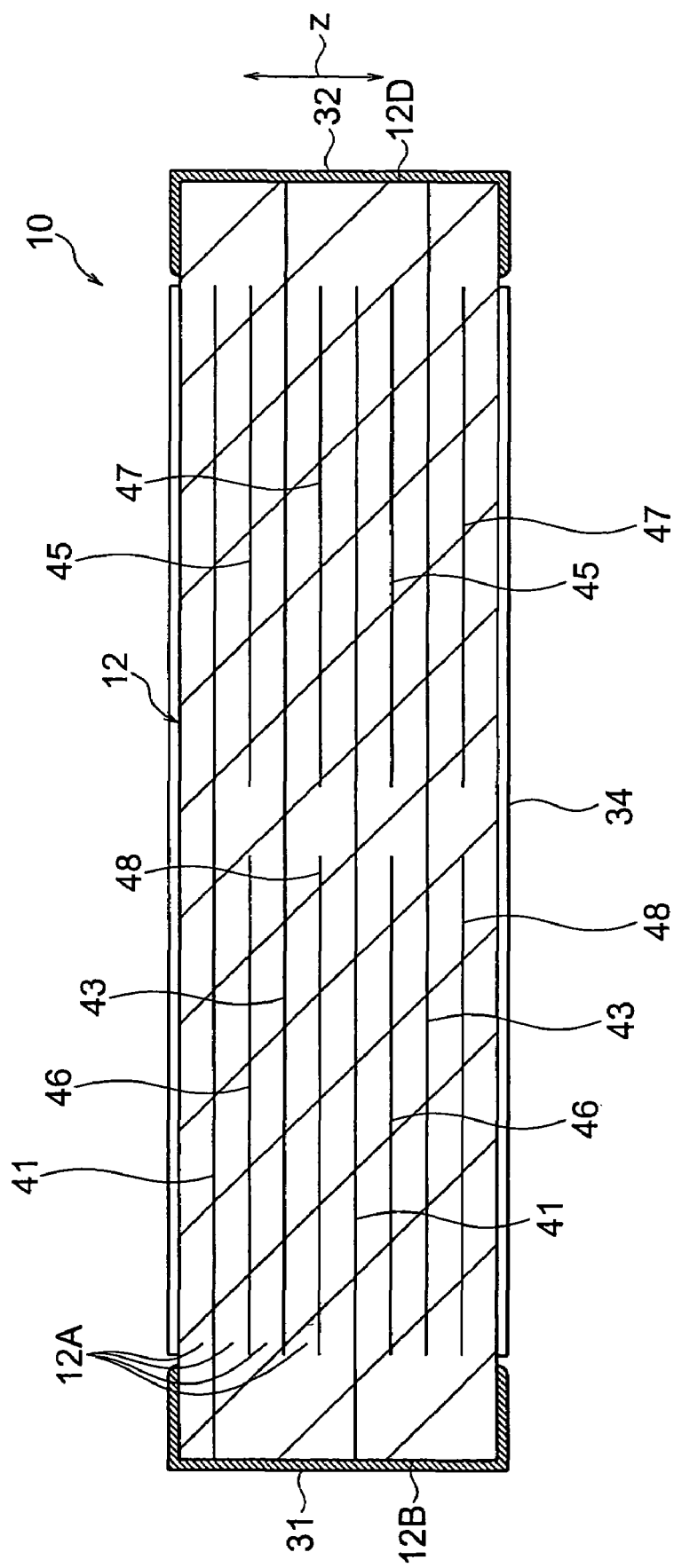
FIG. 6 is a sectional view of multilayer capacitor shown in FIG. 5.

Next, the second embodiment of multilayer capacitor according to the present embodiment is described based on FIG. 5 and FIG. 6. Further, parts common with the parts explained in the first embodiment are assigned the same reference numerals and overlapping explanations are omitted.

According to the above first embodiment, each internal conductors are formed independently in the same plane. On the other, considering internal conductors of the present embodiment, as shown in FIG. 5 and FIG. 6, internal conductors arranged in the same plane are segmented in the way that the conductors extend in the parallel form. The first internal conductor 21 laminated on the top as shown in FIG. 5 comprises a plural number (2 in the present embodiment) of segmented conductors 41 and 42 that are alternately led out by two facing side surfaces 12B and 12D (shown in FIG. 2) of dielectric body 12.

The first internal conductor 22 making a pair with the first internal conductor 21 are segmented in the way that they extend in the parallel form, and the first internal conductor 22 comprises a plural number (2 in the present embodiment) of segmented conductors 43 and 44 alternately led out toward two facing side surfaces 12B and 12D of dielectric body 12. The segmented conductors 43 and 44 superpose upon said segmented conductors 41 and 42 when observed from planner view, though a segmented conductor and a segmented conductor that superpose upon said segmented conductor are led out in the opposite direction toward two facing side surfaces 12B and 12D.

Namely, mutually facing segmented conductors 41 and 43 in the laminated direction (planner view direction) are led out respectively toward two mutually facing side surfaces 12B and 12D. In the same way, mutually facing segmented conductors 42 and 44 in the laminated direction are led out respectively toward two facing side surfaces 12D and 12B. In the present embodiment, the segmented conductor 41 and the segmented conductor 44 are respectively connected to terminal electrode 31 as shown in FIG. 2 and the segmented conductor 42 and the segmented conductor 43 are respectively connected to terminal electrode 32 as shown in FIG. 2.

According to the present embodiment, the second internal conductor 23 is also segmented in the way that the segmented conductors mutually extend in the parallel form and it comprises a plural number (2 in the present embodiment) of segmented conductors 45 and 46 alternately led out toward two facing side surfaces 12C and 12E (as shown in FIG. 2) of dielectric body 12. The second internal conductor 24 is also segmented in the way that the segmented conductors mutually extend in the parallel form and it comprises a plural number (2 in the present embodiment) of segmented conductors 47 and 48 alternately led out toward two facing side surfaces 12C and 12E of dielectric body 12. The segmented conductors 45 and 46 superpose upon the segmented conductors 47 and 48 when observed from planner view, though a segmented conductor and a segmented conductor that superpose upon said segmented conductor are led out in the opposite direction toward two facing side surfaces 12C and 12E.

Namely, mutually facing segmented conductors 45 and 47 are respectively led out toward two facing side surfaces 12C and 12E. And mutually facing segmented conductors 46 and 48 are respectively led out toward two facing side surfaces 12E and 12C. In the present embodiment, segmented conductor 45 and segmented conductor 48 are respectively connected to terminal electrode 33 as shown in FIG. 2 and segmented conductor 46 and segmented conductor 47 are respectively connected to terminal electrode 34 as shown in FIG. 2.

Accordingly, electric currents flow in the opposite direction in segmented conductors 41 and 42 and in segmented conductors 43 and 44 shown by arrows in FIG. 5 and electric currents flow in the opposite direction in segmented conductors 45 and 46 and between segmented conductors 47 and 48 shown by arrows in FIG. 5. Accordingly, not only bringing about an action to cancel the magnetic field, but electric flows in the opposite direction in the same plane in segmented conductors 41 and 42, between segmented conductors 43 and 44, between segmented conductors 45 and 46, and between segmented conductors 47 and 48 respectively extended in the parallel forms, respectively bring about an action to cancel the magnetic field.

As a result, with an action to cancel magnetic field between each internal conductors, parasitic inductances of multilayer capacitor 10 can substantially be reduced then, it becomes effective to reduce equivalent serial inductance (ESL).

The Third Embodiment

Figure 7:
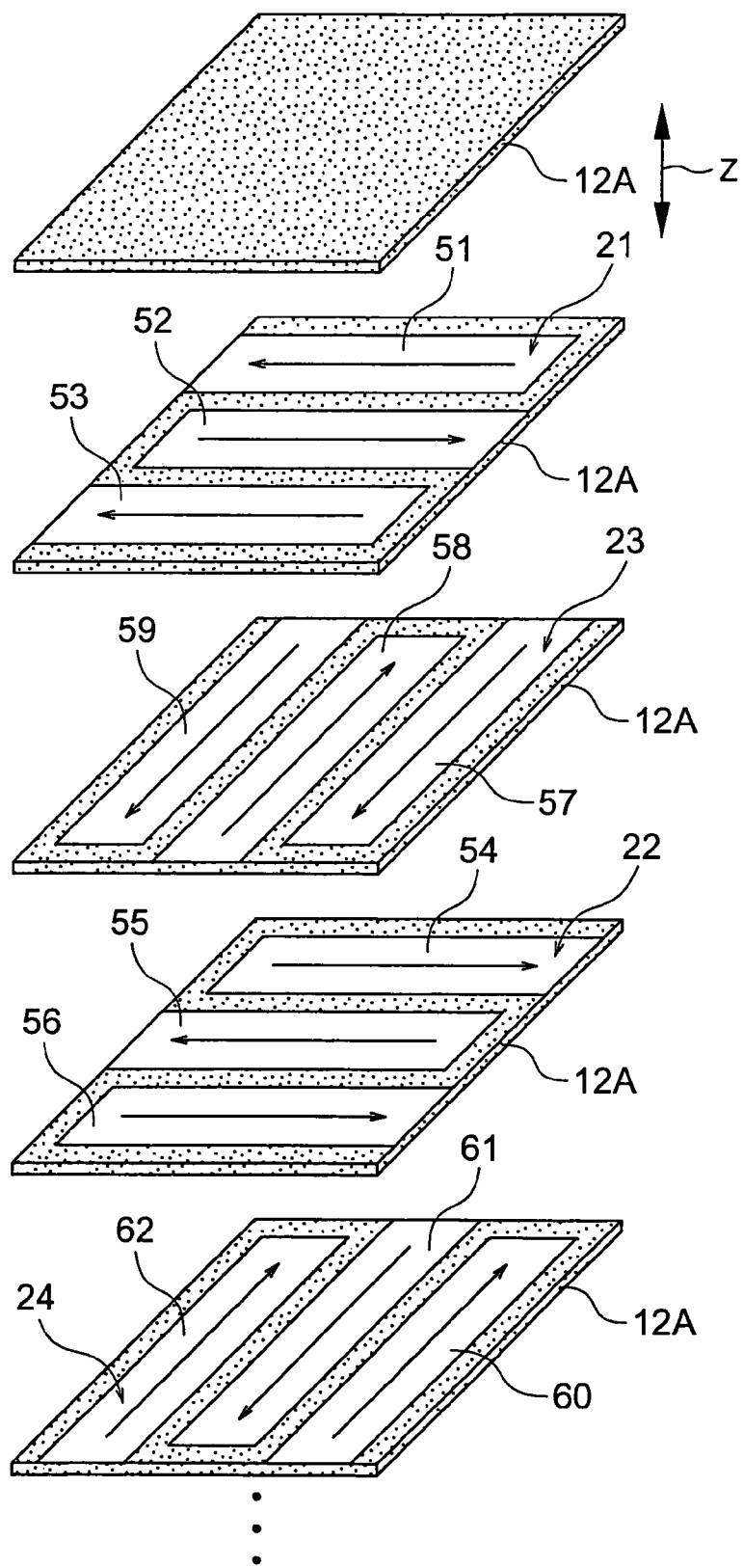
FIG. 7 is a broken down perspective view of multilayer capacitor according to the other, embodiment of the invention.

Next, the third embodiment of multilayer capacitor according to the present embodiment is described based on FIG. 7. Further, parts common with the parts explained in the first embodiment are assigned the same reference numerals and overlapping explanations are omitted.

In the present embodiment, as shown in FIG. 7, the first internal conductor 21 comprises a plural number (3 in the present embodiment) of segmented conductors 51, 52 and 53 that are alternately led out toward two facing side surfaces 12B and 12D (shown in FIG. 2) of dielectric body 12.

Further, the first internal conductor 22 comprises a plural number (3 in the present embodiment) of segmented conductors 54, 55 and 56 that are led out toward two facing side surfaces 12B and 12D of dielectric body 12. These segmented conductors 54, 55 and 56 superpose upon the segmented conductors 51, 52 and 53 when observed from planner view, though the segmented conductors and segmented conductors that lie upon said segmented conductors are led out in the opposite direction toward two facing side surfaces 12B and 12D.

Namely, mutually facing segmented conductors 51 and 54 in the laminated direction are led out respectively toward two facing side surfaces 12B and 12D. In the same way, mutually facing segmented conductors 52 and 55 in the laminated direction are led out respectively toward two facing side surfaces 12D and 12B. In the same way, mutually facing segmented conductors 53 and 56 in the laminated direction are led out respectively toward two facing side surfaces 12B and 12D.

In the present embodiment, the segmented conductors 51, 53 and 55 are respectively connected to terminal electrode 31 as shown in FIG. 2 and the segmented conductor 52, 54 and 56 are respectively connected to terminal electrode 32 as shown in FIG. 2.

The second internal conductor 23 is segmented in the way that the segmented conductors mutually extend in the parallel form and comprises a plural number (3 in the present embodiment) of segmented conductors 57, 58 and 59 led out toward two facing side surfaces 12C and 12E (as shown in FIG. 2) of dielectric body 12. The second internal conductor 24 is also segmented in the way that the segmented conductors mutually extend in the parallel form and it comprises a plural number (3 in the present embodiment) of segmented conductors 60, 61 and 62 led out toward two facing side surfaces 12C and 12E of dielectric body 12. The segmented conductors 60, 61 and 62 superpose upon the segmented conductors 57, 58 and 59 when observed from planner view, though the segmented conductors and the segmented conductors that superpose upon said segmented conductor are led out in the opposite direction toward two facing side surfaces 12C and 12E.

Namely, mutually facing segmented conductors 57 and 60 are respectively led out toward two facing side surfaces 12C and 12E. In the same way, mutually facing segmented conductors 58 and 61 are respectively led out toward two facing side surfaces 12E and 12C. In the same way, mutually facing segmented conductors 59 and 62 are respectively led out toward two facing side surfaces 12C and 12E.

In the present embodiment, segmented conductors 58, 60 and 62 are respectively connected to terminal electrode 33 as shown in FIG. 2 and segmented conductors 57, 59 and 61 are respectively connected to terminal electrode 34 as shown in FIG. 2.

Accordingly, electric currents flow in the opposite direction in segmented conductors 51, 52 and 53 and in segmented conductors 54, 55 and 56 shown by arrows in FIG. 7. Electric currents flow in the opposite direction in segmented conductors 57, 58 and 59 and in segmented conductors 60, 61 and 62 shown by arrows in FIG. 7. As a result, not only bringing about an action to cancel the magnetic field respectively, but electric flows in the opposite direction in the same plane in segmented conductors 51, 52 and 53, in segmented conductors 54, 55 and 56, in segmented conductors 57, 58 and 59, and in segmented conductors 60, 61 and 62 respectively extended in the parallel forms, respectively bring about an action to cancel the magnetic field.

As a result, same with above second embodiment, parasitic inductances of multilayer capacitor 10 can substantially be reduced then, it becomes effective to reduce equivalent serial inductance.

The Fourth Embodiment

Figure 8:
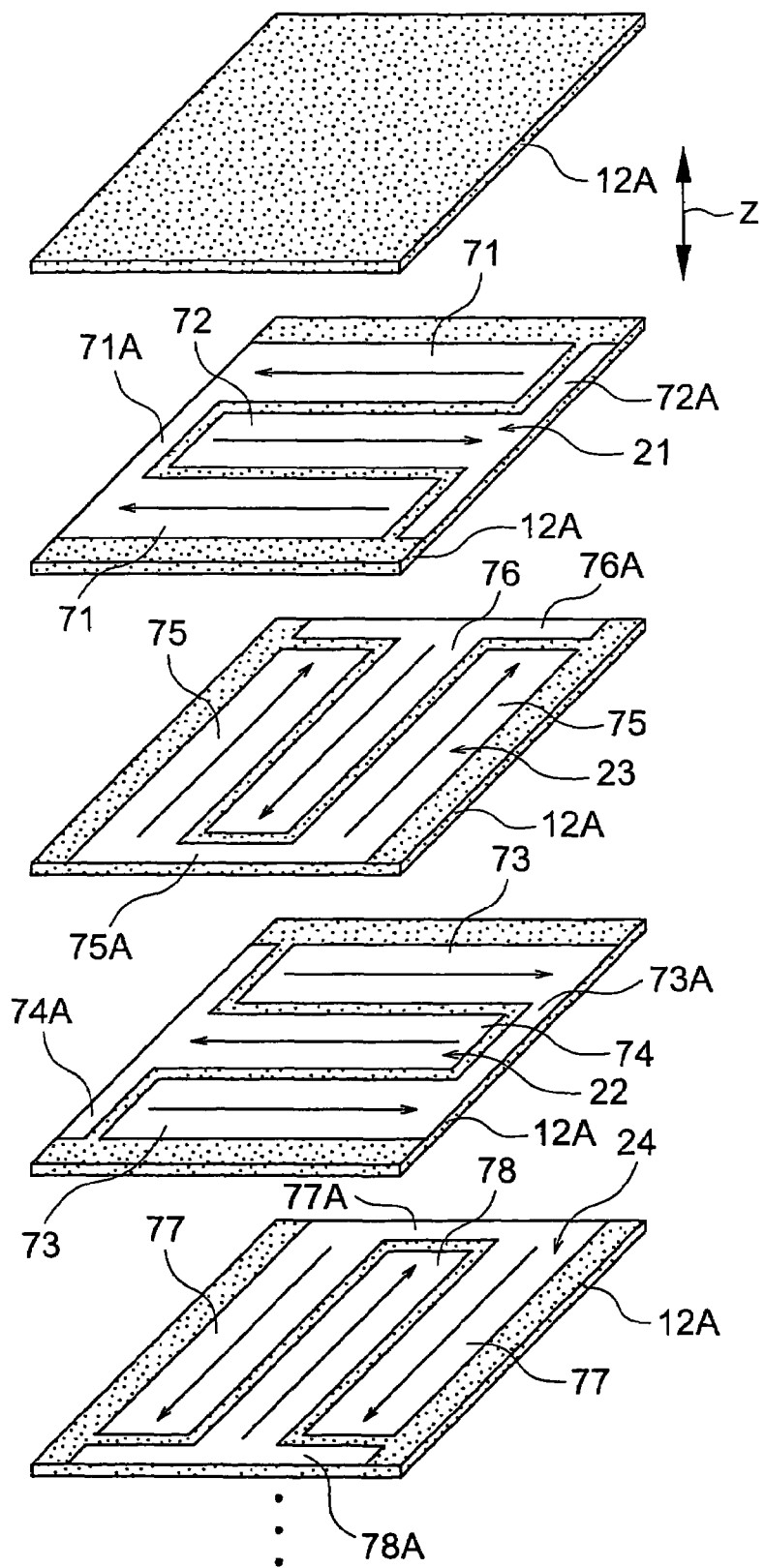
FIG. 8 is a broken down perspective view of multilayer capacitor according to the other embodiment of the invention.

Next, the fourth embodiment of multilayer capacitor according to the present invention is described based on FIG. 8. Further, parts common with the parts explained in the first embodiment are assigned the same reference numerals and overlapping explanations are omitted.

In the present embodiment, as shown in FIG. 8, the first internal conductor 21 comprises a plural number of segmented conductors 71 and 72 that are alternately led out toward two facing side surfaces 12B and 12D (shown in FIG. 2) of dielectric body 12. Provided that in the present embodiment, the segmented conductor 71 is connected to a lead part 71A and nearly U-shaped as a whole. Further, the segmented conductor 72 is united with a lead part 72A having the same width with the lead part 71A and nearly T-shaped as a whole. Then, point part of the segmented conductor 72 should go in between a pair of segmented conductors 71.

The first internal conductor 22 making a pair with the first internal conductor 21 is segmented in the way that they extend in the parallel form, and the first internal conductor 22 comprises a plural number of segmented conductors 73 and 74 alternately led out toward two facing side surfaces 12B and 12D of dielectric body 12. The segmented conductors 73 and 74 superpose upon the segmented conductors 71 and 72 when observed from planner view, though segmented conductors and segmented conductors that superpose upon said segmented conductors are led out in the opposite direction toward two facing side surfaces 12B and 12D.

The segmented conductor 73 is connected to a lead part 73A and nearly U-shaped as a whole. Further, the segmented conductor 74 is united with a lead part 74A having the same width with the lead part 73A and nearly T-shaped as a whole. Then, point part of the segmented conductor 74 should go in between a pair of segmented conductors 73.

Further, the second internal conductor 23, arranged between the first internal conductors 21 and 22, comprises a plural number of segmented conductors 75 and 76 that are alternately led out toward two facing side surfaces 12C and 12E (shown in FIG. 2). Provided that in the present embodiment, the segmented conductor 75 is connected to a lead part 75A and nearly U-shaped as a whole. Further, the segmented conductor 76 is united with a lead part 76A having the same width with the lead part 75A and nearly T-shaped as a whole. Then, point part of the segmented conductor 76 should go in between a pair of segmented conductors 75.

The second internal conductor 24 making a pair with the second internal conductor 23 is segmented in the way that they extend in the parallel form, and The second internal conductor 24 comprises a plural number of segmented conductors 77 and 78 alternately led out toward two facing side surfaces 12C and 12E of dielectric body 12. The segmented conductors 77 and 78 superpose upon the segmented conductors 75 and 76 observed from planner view, though segmented conductors and segmented conductors that superpose upon said segmented conductors are led out in the opposite direction toward two facing side surfaces 12C and 12E.

The segmented conductor 77 is connected to a lead part 77A and nearly U-shaped as a whole. Further, the segmented conductor 78 is united with a lead part 78A having the same width with the lead part 77A and nearly T-shaped as a whole. Then, point part of the segmented conductor 78 should go in between a pair of segmented conductors 77.

The segmented conductors 71 and 74 are connected to terminal electrode 31, the segmented conductors 72 and 73 are connected to terminal electrode 32, the segmented conductors 75 and 78 are connected to terminal electrode 33, the segmented conductors 76 and 77 are connected to terminal electrode 34, and each terminal electrode 71 to 78, same with the second embodiment, is connected to each terminal electrodes 31 to 34 as shown in FIG. 2 respectively.

Accordingly, electric currents flow in the opposite direction in facing segmented conductors 71 and 73 in the laminated direction shown by arrows in FIG. 8. Electric currents also flow in the opposite direction in segmented conductors 72 and 74. Electric currents flow in the opposite direction in facing segmented conductors 75 and 77 in the laminated direction shown by arrows in FIG. 8. Further, electric currents flow in the opposite direction in segmented conductors 76 and 78. Accordingly, abovementioned flows of electric currents bring about an action to cancel the magnetic field.

Further, in the way that the T-shaped segmented conductor 72 goes in between U-shaped segmented conductor 71, even adjoining segmented conductors 71 and 72 mutually extended in the same plane, by electric flow in the opposite direction, respectively bring about an action to cancel the magnetic field. Further, in the same way, between segmented conductors 73 and 74, between segmented conductors 75 and 76, and between segmented conductors 77 and 78 respectively bring about an action to cancel the magnetic field by electric flow in the opposite direction.

As a result, same with above second embodiment, parasitic inductances of multilayer capacitor 10 can substantially be reduced then, it becomes effective to reduce equivalent serial inductance.

The Fifth Embodiment

Figure 9:
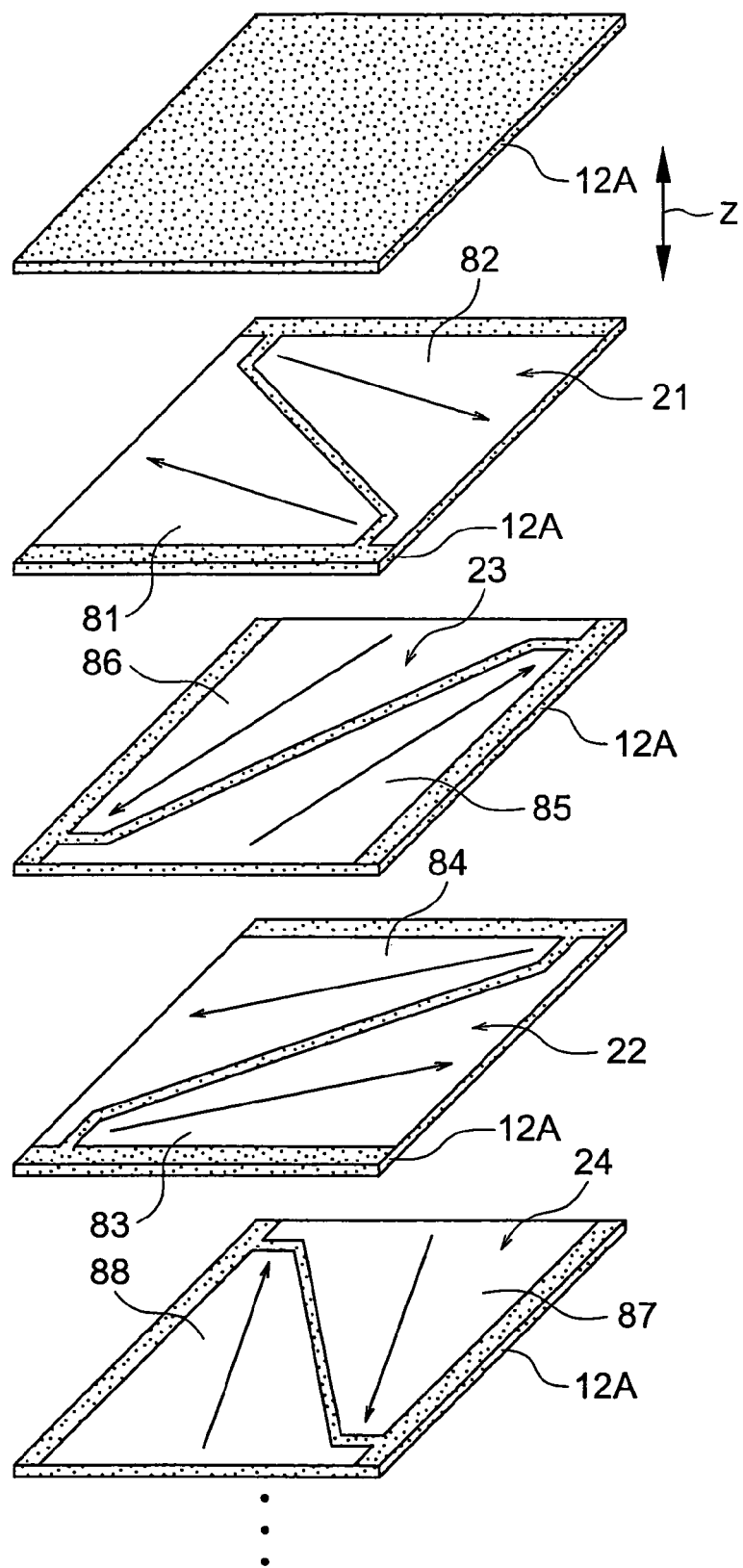
FIG. 9 is a broken down perspective view of multilayer capacitor according to the other embodiment of the invention.

Next, the fifth embodiment of multilayer capacitor according to the present invention is described based on FIG. 9 of the fifth embodiment. Further, parts common with the parts explained in the first embodiment are assigned the same reference numerals and overlapping explanations are omitted.

In the present embodiment, as shown in FIG. 9, the first internal conductor 21 comprises a plural number (2 in the present embodiment) of segmented conductors 81 and 82 that are alternately led out by two facing side surfaces 12B and 12D (shown in FIG. 2) of dielectric body 12. Provided that, in the present embodiment, these segmented conductors 81 and 82 are respectively forming nearly a triangle.

Further, the first internal conductor 22 making a pair with the first internal conductor 21 are segmented in the way that they extend in the parallel form, and a plural number (2 in the present embodiment) of segmented conductors 83 and 84 are alternately led out toward two facing side surfaces 12B and 12D of dielectric body 12. In the present embodiment, these segmented conductors 83 and 84 are respectively forming nearly a triangle. These segmented conductors 83 and 84 are arranged to superpose respectively upon the segmented conductors 81 and 82 when observed from planner view at a position symmetric with respect to a point. The segmented conductors that are symmetric with respect to a point are led out in the opposite direction toward two facing side surfaces 12B and 12D.

The second internal conductor 23 arranged between the first internal conductors 21 and 22 are segmented in the way that they extend in the parallel form, and a plural number (2 in the present embodiment) of segmented conductors 85 and 86 are alternately led out toward two facing side surfaces 12C and 12E(as shown in FIG. 2) of dielectric body 12. Provided that, in the present embodiment, these segmented conductors 85 and 86 are respectively forming nearly a triangle.

Further, the second internal conductor 24 making a pair with the second internal conductor 23 are segmented in the way that they extend in the parallel form, and a plural number (2 in the present embodiment) of segmented conductors 87 and 88 are alternately led out toward two facing side surfaces 12C and 12E of dielectric body 12. In the present embodiment, these segmented conductors 87 and 88 are respectively forming nearly a triangle. These segmented conductors 87 and 88 are arranged to superpose respectively upon the segmented conductors 85 and 86 when observed from planner view at a position symmetric with respect to a point. The segmented conductors that are symmetric with respect to a point are led out in the opposite direction toward two facing side surfaces 12C and 12E.

The segmented conductors 81 and 84 are connected to terminal electrode 31, the segmented conductors 82 and 83 are connected to terminal electrode 32, the segmented conductors 85 and 88 are connected to terminal electrode 33, the segmented conductors 86 and 87 are connected to terminal electrode 34. Namely, each terminal electrode 81 to 88, same with the second embodiment, is respectively connected to each terminal electrodes 31 to 34 shown in FIG. 2.

Accordingly, electric currents flow in the opposite direction in facing segmented conductors 81 and 83 in the laminated direction shown by arrows in FIG. 9. Electric currents flow in the opposite direction in segmented conductors 82 and 84. Electric currents flow in the opposite direction in facing segmented conductors 85 and 87 in the laminated direction shown by arrows in FIG. 9. In the same way, electric currents flow in the opposite direction in segmented conductors 86 and 88. Accordingly, abovementioned flows of electric currents bring about an action to cancel the magnetic field.

Further, electric flows in the opposite direction in the same plane in segmented conductors 81 and 82, in segmented conductors 83 and 84, in segmented conductors 85 and 86, and in segmented conductors 87 and 88 respectively extended in the parallel forms, respectively bring about an action to cancel the magnetic field.

As a result, in the present embodiment, in the same way as the second embodiment, with an action to cancel magnetic field between each internal conductors, parasitic inductances of multilayer capacitor 10 can substantially be reduced then, it becomes effective to reduce equivalent serial inductance(ESL).

The Sixth Embodiment

Figure 10:
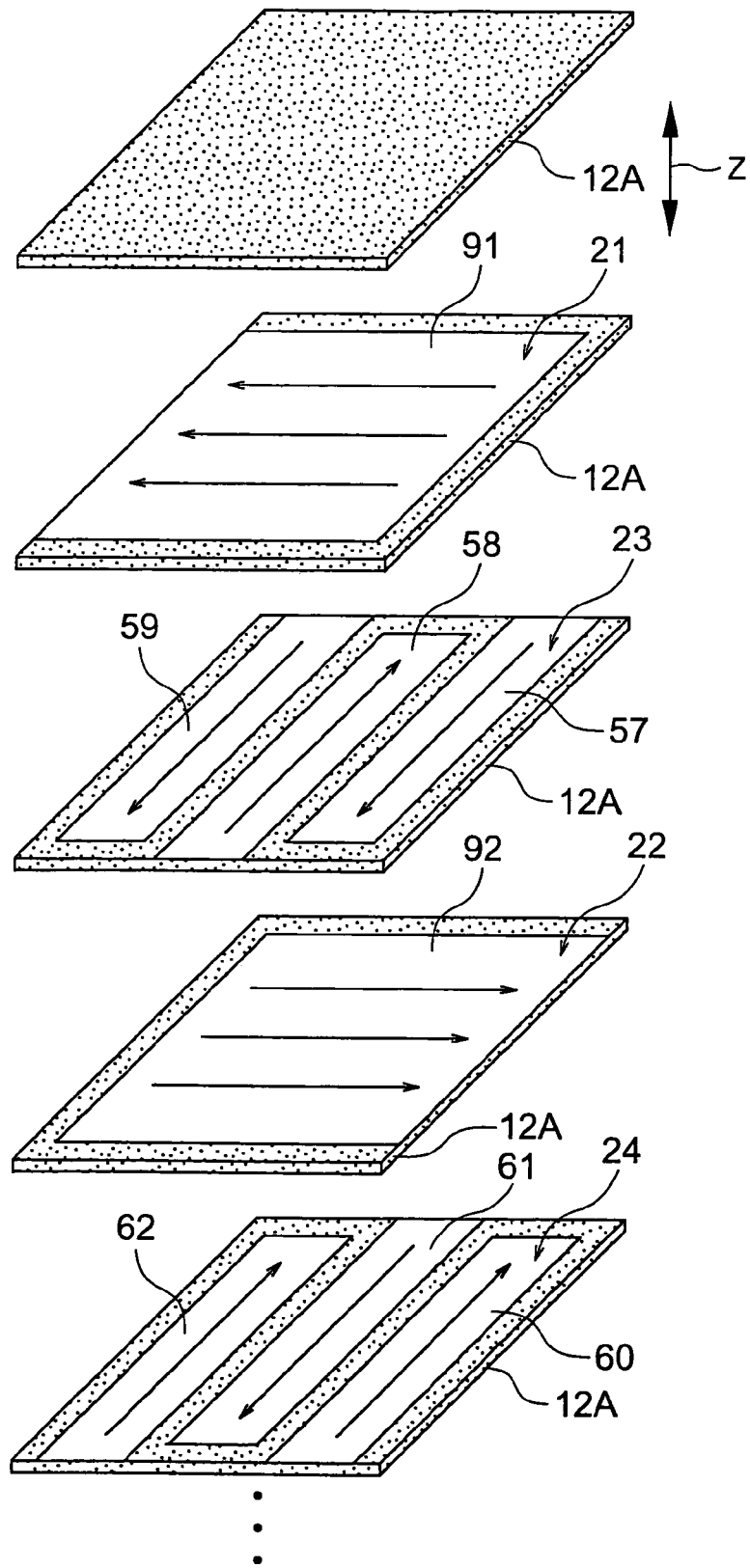
FIG. 10 is a broken down perspective view of multilayer capacitor according to the other embodiment of the invention.

Next, multilayer capacitor of sixth embodiment according to the present invention is described based on FIG. 10. Further, parts common with the parts explained in the first embodiment are assigned the same reference numerals and overlapping explanations are omitted.

In the present embodiment, as shown in FIG. 10, a pair of the first internal conductors 21 and 22 comprises internal conductors 91 and 92 manufactured in nearly the same way with the first embodiment. Further, a pair of the second internal conductors 23 and 24, in the same way as the third embodiment, respectively comprises 3 segmented conductors 57, 58 and 59 and 3 segmented conductors 60, 61 and 62.

In the present embodiment, internal conductor 91 is connected to terminal electrode 31 and internal conductor 92 is connected to terminal electrode 32. Further, segmented conductors 58, 60 and 62 are respectively connected to terminal electrode 33 and segmented conductors 57, 59 and 61 are respectively connected to terminal electrode 34.

Accordingly, electric currents flow in the opposite direction in facing internal conductors 91 and 92 in the laminated direction shown by arrows in FIG. 10. Electric currents flow in the opposite direction between in segmented conductors 57, 58 and 59 and in segmented conductors 60, 61 and 62. Accordingly, abovementioned flows of electric currents respectively bring about an action to cancel the magnetic field. Further, flows of electric currents among segmented conductors 57, 58 and 59 and among segmented conductors 60, 61 and 62, extended in parallel form in a plane, respectively bring about an action to cancel the magnetic field.

As a result, even with the present embodiment, same with the second embodiment, parasitic inductances of multilayer capacitor 20 can substantially be reduced then, it becomes effective to reduce equivalent serial inductance(ESL).

EXAMPLE 1

Figure 11A:
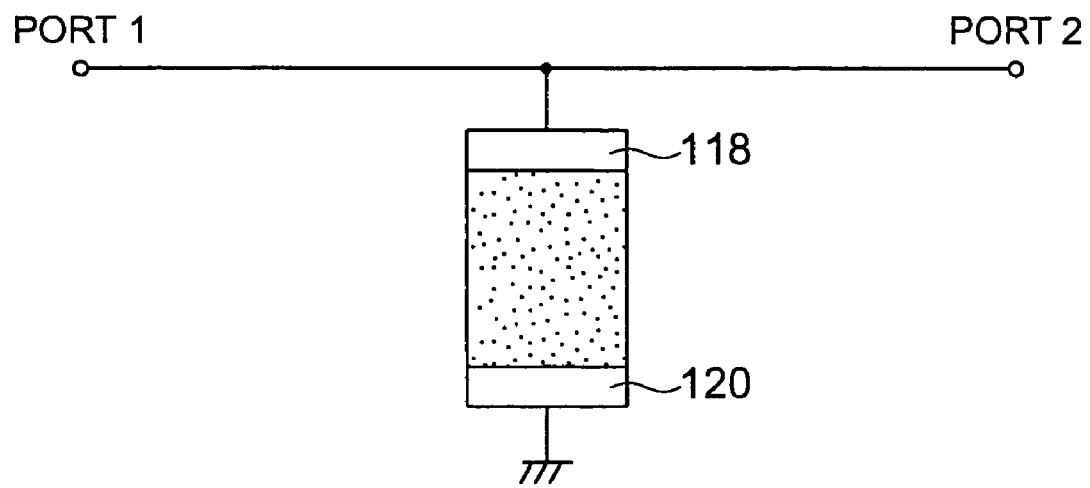
FIG. 11A is a circuit diagram showing a state of capacitor as in comparative example of the invention connected to network analyzer.
Figure 11B:
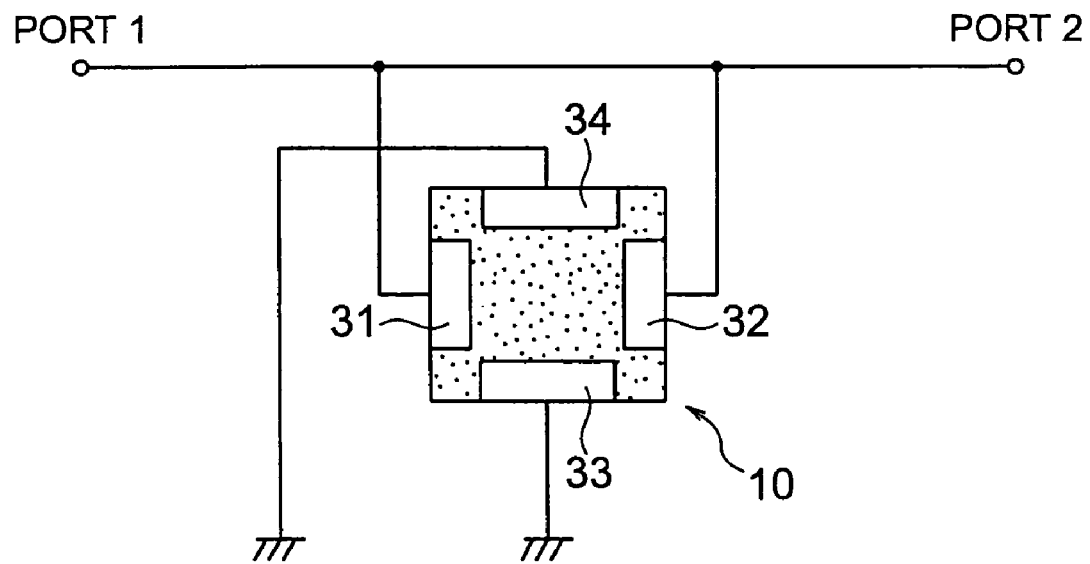
FIG. 11B is a circuit diagram showing a state of capacitor as in example of the invention connected to network analyzer.
Figure 21:
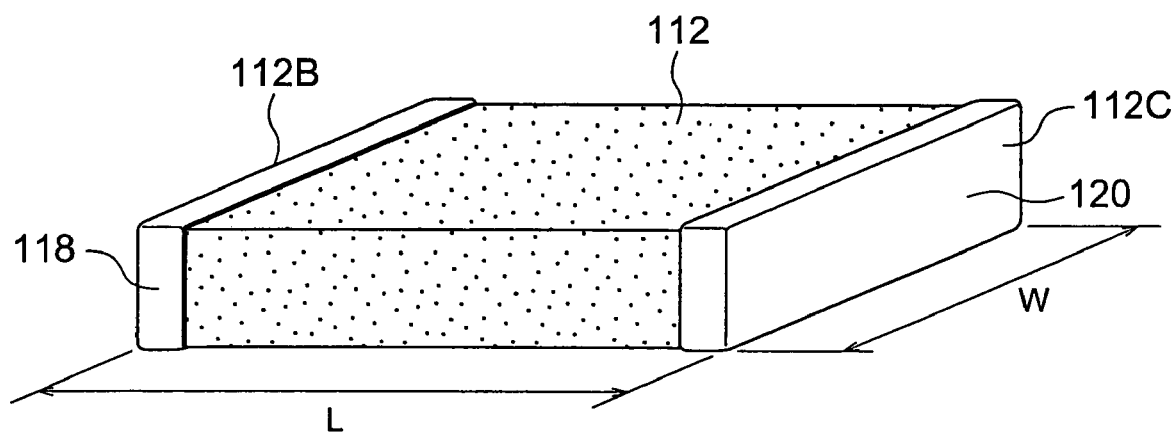
FIG. 21 is a perspective view of multilayer capacitor as in conventional example.
Figure 22:
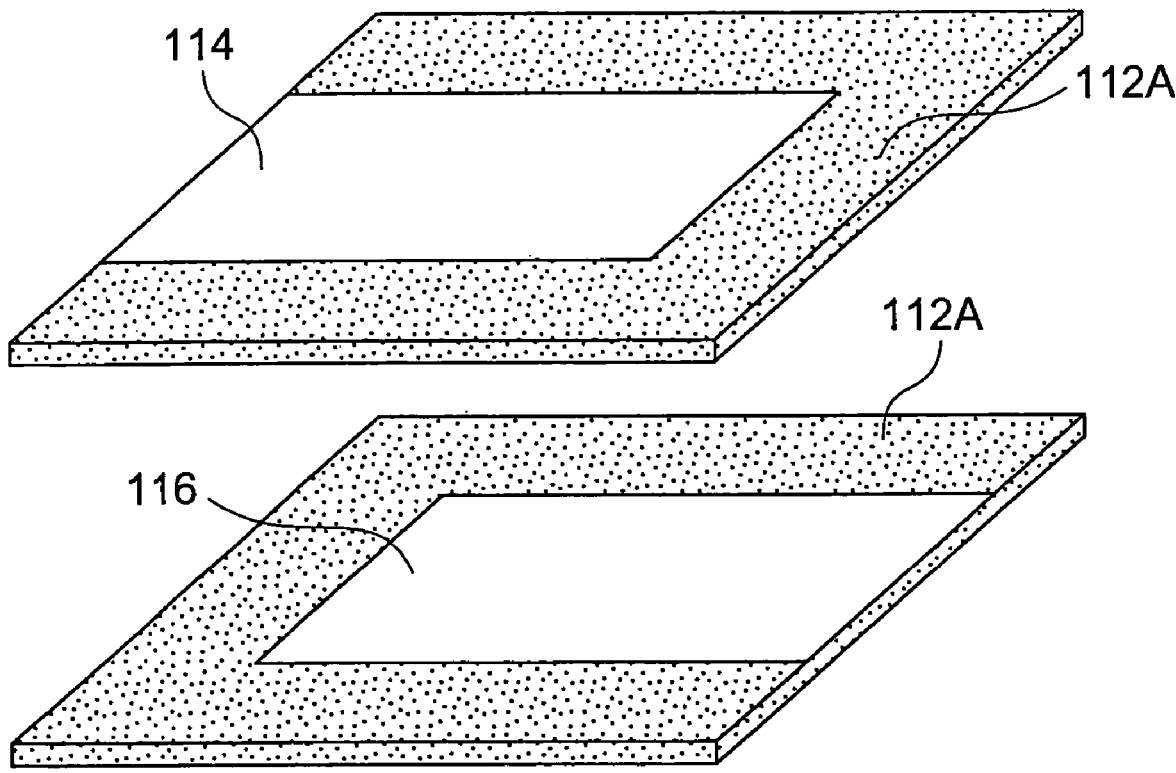
FIG. 22 is a broken down perspective view showing part of internal conductor of multilayer capacitor as in conventional example.

Next, with network analyzer, S21 characteristic of S parameter of each sample below were measured and attenuation characteristics of each sample were respectively found. First, content of each sample are described. Namely, generally used capacitor of multilayer capacitor having two terminal electrodes as shown in FIGS. 21 and 22 are made comparative example 1 and multilayer capacitor having four terminal electrodes according to the second embodiment as shown in FIG. 5 and FIG. 6 are made example 1. Then, capacitor of the comparative example 1 is connected to Port 1 and Port 2 of network analyzer as shown in FIG. 11A and further, in the same way, capacitor of example 1 is connected to the same as shown in FIG. 11B and respectively measured.

Figure 12:
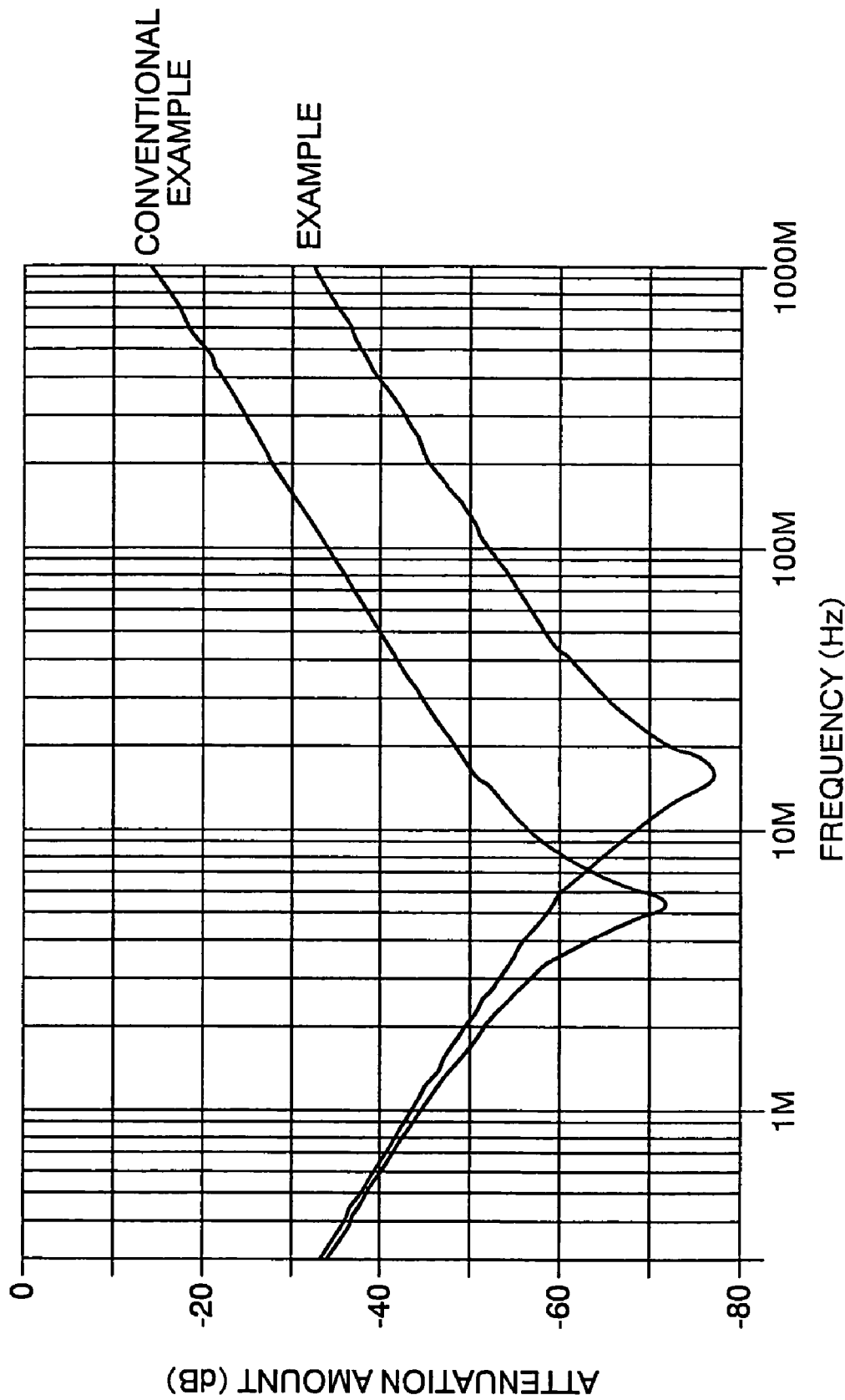
FIG. 12 is a graph of attenuation characteristics showing capacitor of example and comparative example of the invention.
Figure 20:
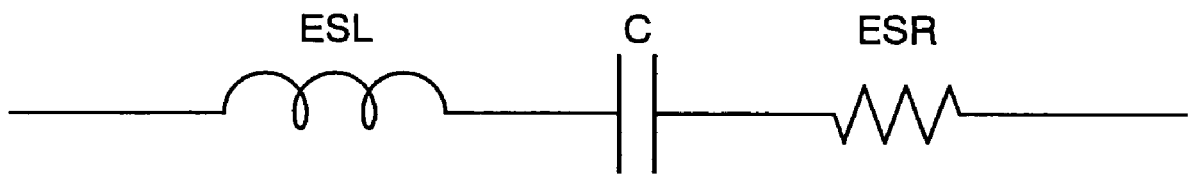
FIG. 20 is an equivalent circuit diagram of multilayer capacitor as in conventional example.

Here, a constant of equivalent circuit, wherein a measured value of the attenuation characteristic and attenuation amount of the equivalent circuit as shown in FIG. 20 are the same, were measured. From the data of the attenuation characteristics of each sample shown in FIG. 12, it can be noticed that the attenuation amount of Example 1 at a high frequency range of at least 20 MHz is increasing in the amount of approximately 15 dB compared to comparative example 1. From the data, an improvement of high frequency characteristics in examples can be seen.

On the other, calculated ESL shown in table 1 is substantially reduced in Example 1 compared to the same in comparative example 1. Therefore, it was confirmed that table 1 also proves the effect of the invention.

TABLE 1

|  | C (µF) | ESR (mΩ) | ESL (pH) |
| --- | --- | --- | --- |
| Comp. Ex. 1 | 1.038 | 6.3 | 825.2 |
| Ex. 1 | 0.954 | 3.3 | 102.3 |

In the table 1, C is electrostatic capacities and ESL is equivalent serial resistance. The size of each sample used here is, as shown in FIGS. 21 and 2, when the distance between side surfaces of dielectric body where a pair of internal conductors are led out is L and the distance between side surfaces that lie at right angles with the side surfaces of dielectric body where a pair of internal conductors are led out is W, the sizes of each samples used are as following. In comparative example 1, L=2.0 mm and W=1.25 mm and in example 1, L=1.6 mm and W=1.6 mm.

Further, multilayer capacitor 10 according to the above embodiment is considered to have two sets, each set having 4 layers, and 8 layers in all. However, the number of layers is not limited to this and it can further be increased. For instance, the number of layers may be several decades or several hundreds. After the second embodiment of the above-mentioned embodiment, structures each having 2 or 3 segmented conductors are arranged is shown, though each may have 4 segmented conductors.

The Seventh Embodiment

Figure 13:
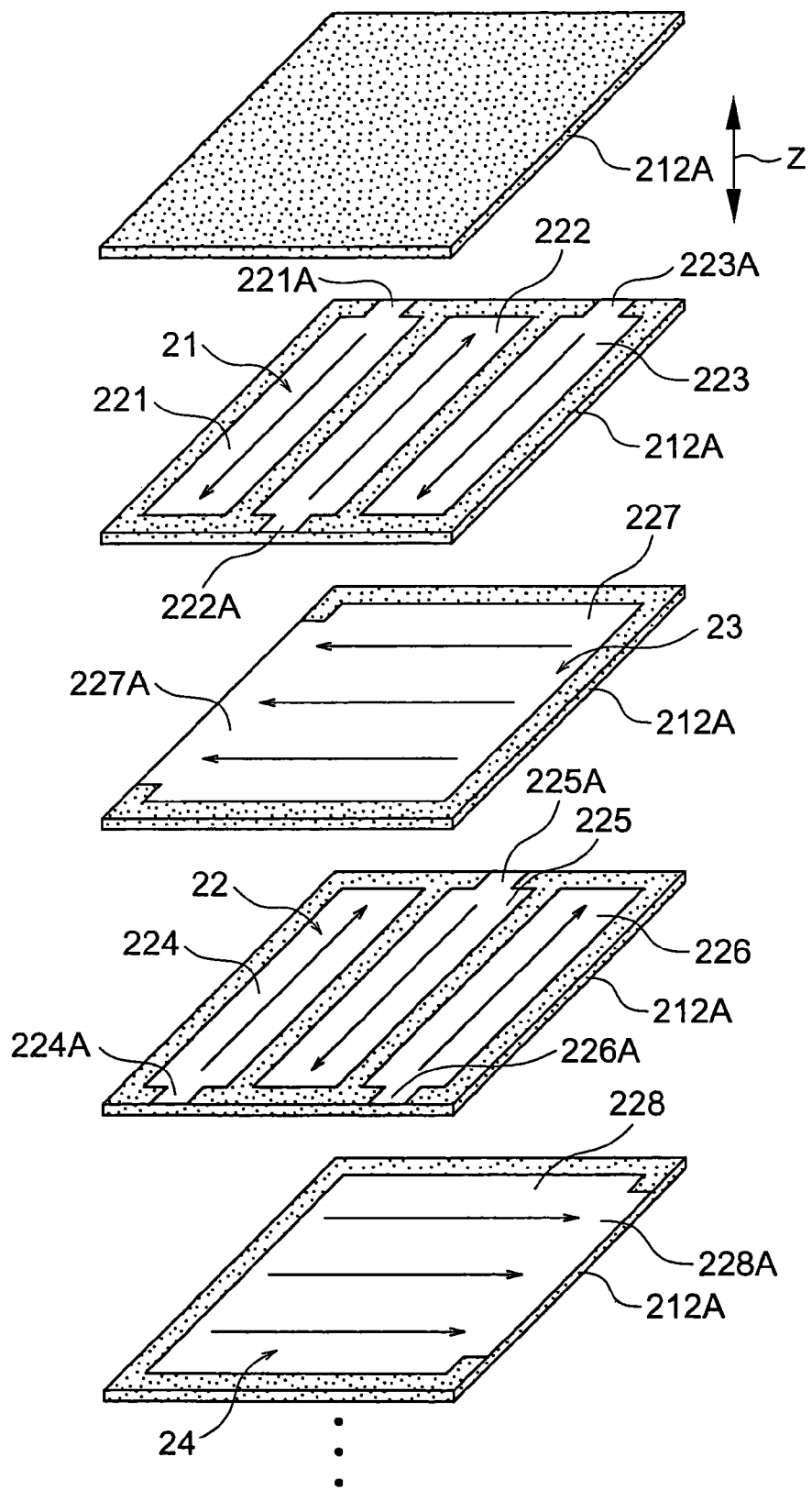
FIG. 13 is a broken down perspective view of multilayer capacitor according to the other embodiment of the invention.
Figure 14:
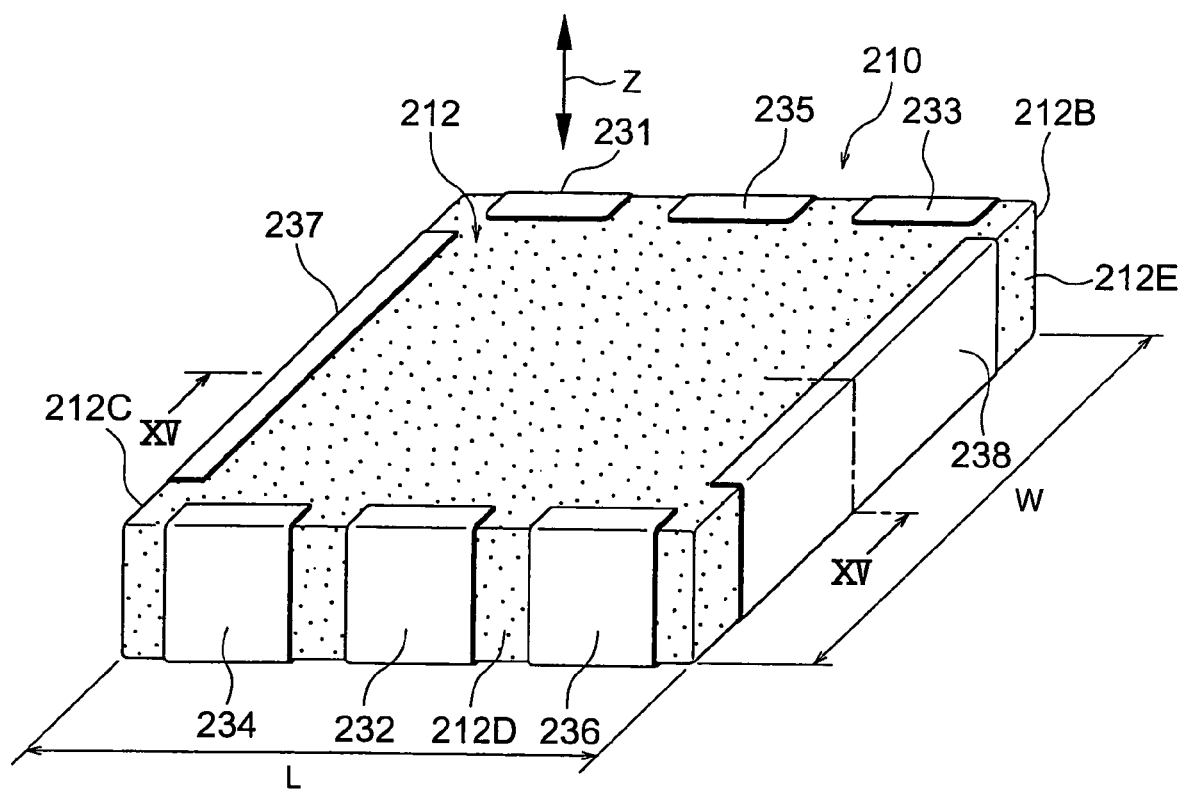
FIG. 14 is a perspective view of multilayer capacitor shown in FIG. 13.
Figure 15:
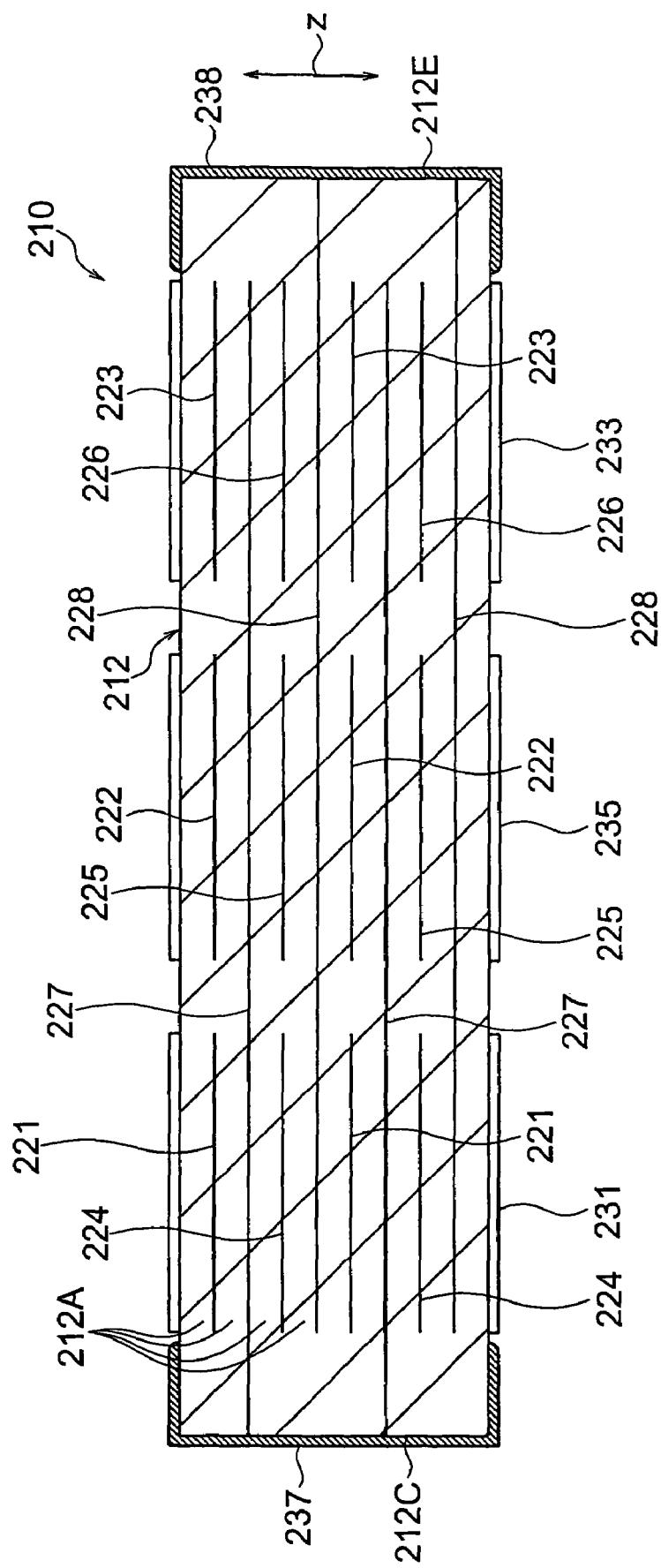
FIG. 15 is a sectional view of FIG. 14 taken along the line XV—XV.

Multilayer ceramic capacitor (only mentioned "Multilayer capacitor" from here) 210 according to the present embodiment is shown in FIG. 13 to 15. As shown in these figures, the multilayer capacitor 210 comprises a main portion of dielectric body 212 which is a rectangular parallelepiped sintered body obtained by firing multilayer body wherein a plural number of ceramic green sheet of dielectric sheets are laminated.

In the dielectric body 212, the first internal conductors 21, the second internal conductors 23, the first internal conductors 22 and the second internal conductors 24 are arranged. Between each layer, ceramic layers 212A are respectively arranged. The first internal conductor 21 comprises segmented conductors 221, 222 and 223 and the first internal conductor 22 making a pair with said first internal conductor 21, comprises segmented conductors 224, 225 and 226. The second internal conductors 23 and 24 respectively comprise only one internal conductor 227 and 228.

Namely, in the present embodiment, having ceramic layers 212A as dielectric sheets after firing are disposed in between, segmented conductors 221 to 223, an internal conductor 227, segmented conductors 224 to 226 and an internal conductor 228 are respectively arranged in dielectric body 12 in the order. Further, underneath the internal conductor 228, as shown in FIG. 15, in the same order as mentioned above, these 4 layers of electrodes are repeated and two sets in total are arranged where a set comprises said 4 layers of electrodes. As the materials of segmented conductors 21 to 26 each forming approximate rectangle and internal conductors 27 and 28 each forming approximate square, not only base metal materials such as Nickel, Nickel alloy, copper, or copper alloy can be used but materials comprising said metals as main component may also be used.

Further, as shown in FIG. 13 to 15, at back side of the segmented conductors 221 and 223, lead parts 221A and 223A where side surface 212B (shown in FIG. 14) of back side of dielectric body 212 are respectively formed. The segmented conductors 221 and 223 are respectively extended from the side face 212B toward the facing side surface 212D (as shown in FIG. 2).

At the front side of segmented conductor 222 arranged between these segmented conductors 221 and 223, a lead part 222A drawn toward the side surface 212D of front side of dielectric body 212 is formed. The segmented conductor 222 is extended from the drawn side surface 212D toward the facing side surface 212B.

Namely, these plural number (3 in the present embodiment) of segmented conductors 221, 222 and 223 are segmented in the way that the conductors are mutually lined up and extended in the same plane and are alternately led out toward the two facing side surfaces 212B and 212D.

Underneath these segmented side surfaces 221 to 223, an internal conductor 227 is arranged and at the left side portion of this internal conductor 227, a branch portion 227A led out from the left side surface 212C (shown in FIG. 14) of dielectric body 212 is formed. Internal conductor 227 is extended from the led out side surface 212C toward the facing side surface 212E(shown in FIG. 2).

Underneath this internal conductor 227, a plural number (3 in the present embodiment) of segmented conductors 224, 225 and 226 are arranged. At the front side of said segmented conductors 224 and 226, a branch portion 224A and 226A led out from the side surface 212D of front side of dielectric body 212 are respectively formed. These segmented conductors 224 and 226 are respectively extended from the side surface 212D toward the facing side surface 212B.

At back side of the segmented conductor 225 arranged between these segmented conductors 224 and 226, a branch portion 225A led out toward side surface 212B of back side of dielectric body 212. This segmented conductor 225 is extended from the side surface 212B toward the facing side surface 212D.

Namely, these plural number (3 in the present embodiment) of segmented conductors 224, 225 and 226 are segmented in the way that the conductors are extending mutually in a line in a plain and are alternately led out toward the two facing side surfaces 212D and 212B. Further, the segmented conductors 224, 225, and 226 respectively superpose upon the segmented conductors 221, 222, and 223 when observed from planner view. A segmented conductor and a segmented conductor that superpose upon said segmented conductor are led out in the opposite direction.

Underneath these segmented conductors 224 to 226, an internal conductor 228 is arranged and at right side of this internal conductor 228, a branch portion 228A led out from the right side surface 212E of dielectric body 212 is formed. Internal conductor 228 is extended from the side surface 212E toward the facing side surface 12C.

Considering above, segmented conductors 221 and 224 led out toward the two facing side surfaces 12B and 12D, although internal conductor 227 is disposed in between, are arranged mutually in the laminated direction (the direction shown by an arrow Z). In the same way as above, an segmented conductor 222 and the segmented conductor 225 are, although internal conductor 227 is disposed in between, mutually facing in the laminated direction. And in the same way, the segmented conductor 223 and the segmented-conductor 226 are, although internal conductor 227 is disposed in between, mutually facing in the laminated direction. Further, segmented conductors 224, 225 and 226, and the segmented conductors 221, 222 and 223 shown in FIG. 15 arranged underneath said segmented conductors 224, 225 and 226 have the same relation as mentioned above.

And a pair of internal conductors 227 and 228 are respectively led out toward the two facing side surfaces 212C and 212E, different from the two facing side surfaces 212B and 212D where said 6 segmented conductors 221 to 226 are led out.

As shown in FIG. 14, as to connect to lead parts 221A, 222A and 223A of each segmented conductors 221, 222 and 223, a plural number (3 in the present embodiment) of terminal electrodes 231, 232 and 233 is alternately arranged to the outer part of dielectric body 212 at the side surfaces 212B and 212D of dielectric body 212.

Further, in order to connect to lead parts 224A, 225A and 226A of each segmented conductors 224, 225 and 226, a plural number (3 in the present embodiment) of terminal electrodes 234, 235 and 236 are alternately arranged to the outer part of dielectric body 12 at side surfaces 212D and 212B of dielectric body 212.

Further, in order to connect to lead parts 227A of internal conductor 227, terminal electrode 237 is arranged to the outer part of dielectric body 212 at the side surface 212C of dielectric body 212. Further, in order to connect to lead parts 228A of internal conductor 228, terminal electrode 238 is arranged to the outer part of dielectric body 12 at the side surface 212E of dielectric body 212.

Namely, as shown in FIG. 14, these terminal electrodes 231, 232, and 233 and terminal electrodes 234, 235, and 236 are respectively arranged to the two facing side surfaces 212B and 212D of dielectric body 212. Further, terminal electrodes 237 and 238 are respectively arranged at two facing side surfaces 212C and 212E different from the two facing side surfaces 212B and 212D where terminal electrodes 231 to 236 are arranged. Capacitor according to the present embodiment is array type multilayer capacitor.

According to the present embodiment, considering FIGS. 13 and 15, internal conductor 227 is arranged between segmented conductors 221 to 223 and segmented conductors 224 to 226. And segmented conductors 224 to 226 are arranged between internal conductor 227 and internal conductor 228. Namely, mutually facing electrodes of capacitor are formed between segmented conductors 221 to 223 and internal conductor 227, internal conductor 227 and segmented conductors 224 to 226, and segmented conductor 224 to 226 and internal conductor 228, and consequently developing capacitor functions.

And, in the present embodiment, terminal electrodes 231 to 236 arranged at two side surfaces 212B and 212D respectively connected at segmented conductors 221 to 226 composes pairs of the first terminal electrodes. Terminal electrodes 237 and 238 arranged at two side surfaces 212C and 212E respectively connected at internal conductors 227 and 228 compose pairs of the second terminal electrodes. Multilayer capacitor 210 according to the present embodiment comprises terminal electrodes 231 to 236 and terminal electrodes 237 and 238 respectively arranged at all four side surfaces 212B to 212E of dielectric body 212 in shape of a hexahedron form of rectangular parallelepiped.

Next, multilayer capacitor 210 according to the present embodiment is described. In order to function as capacitor, 3 pairs of terminal electrodes 231 to 236 is connected to wiring or so at the outer part of multilayer capacitor 210 in order that the electrodes have mutually homopolar characteristic. In these segmented conductors 221 to 223 and segmented conductors 224 to 226, as shown in FIG. 13 with arrows, electric currents pass in opposite direction and 3 segmented conductors 221 to 223 and segmented conductors 224 to 226 become mutually homopolar.

A pair of facing terminal electrodes 237 and 238 are connected to wiring or so at outer part of multilayer capacitor 210 in the way that the terminal electrodes are mutually homopolar. In a pair of internal electrodes 227 and 228, with the same reason, shown with arrows as in FIG. 1, electric currents flow in the opposite direction and a pair of internal conductors 227 and 228 becomes mutually homopolar.

Further, electric currents start to flow in the opposite direction in adjoining segmented conductors 221 to 223. By the same reason, electric currents start to flow in the opposite directions in adjoining segmented conductors 224 to 226 in the way that the electric currents in said conductors 224 to 226 are respectively opposite to the electric currents in corresponding conductors 221 to 223.

Accordingly, electric currents flow in the opposite direction between in 3 segmented conductors 221 to 223 and in 3 segmented conductors 224 to 226. Further, electric currents flow in the opposite direction in a pair of internal conductors 227 and 228. Accordingly, in the laminated direction, not only bringing about an action to cancel the magnetic field, but by electric flows in the opposite direction in the same plane, it brings about an action to cancel the magnetic field.

Then, with an action to cancel magnetic field between these conductors, parasitic inductances of multilayer capacitor 210 can be reduced then, it becomes effective to reduce equivalent serial inductance (ESL).

According to above, multilayer capacitor 210 of the present embodiment, it is preferably used as decoupling capacitor and substantial reduce of ESL of multilayer capacitor 210 can be achieved. And according to multilayer capacitor 210 of the present embodiment, together with an improvement in an attenuation amount at a high frequency range, it becomes possible to suppress the voltage fluctuations of power supply and is preferably used in CPU power supply circuit.

According to FIG. 15, a plural set of 3 segmented conductors 221 to 223, 3 segmented conductors 224 to 226, and a pair of internal conductors 227 and 228 is respectively arranged in dielectric body 12 to increase capacitance of multilayer capacitor 210 of the present embodiment. With multilayer capacitor 210 of the present embodiment, an action to cancel magnetic field further increases and inductance are substantially reduced and ESL is further reduced.

On the occasion of manufacturing multilayer capacitor 210 of the present embodiment, by laminating dielectric sheets that are in quadrilateral form such as rectangular parallelepiped, dielectric body 212 can be formed in rectangular parallelepiped form. As a result, multilayer capacitor 210 of the present embodiment comprises lead parts of conductors that are provided on all side surfaces 12 B to 12E of dielectric body 12 in shape of rectangular parallelepiped form having 4 side surfaces 12B to 12E that are in optimum form from the stand point of manufacturing method. Accordingly, multilayer capacitor 210 uses its ability to the full to reduce ESL.

Figure 16:
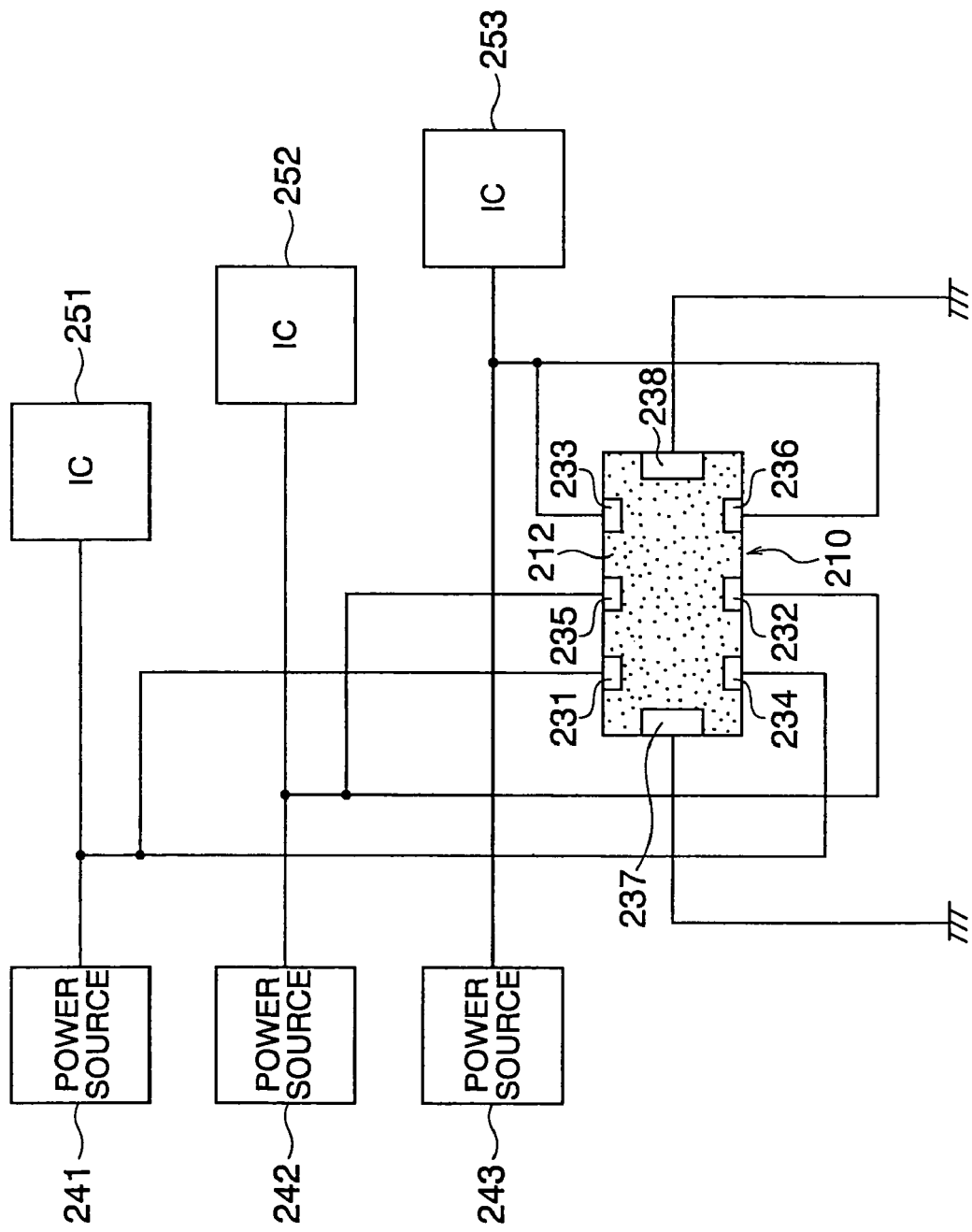
FIG. 16 is a circuit diagram showing example of using multilayer capacitor shown in FIG. 13 to 15.

Next, examples of using multilayer capacitor 210 according to the present embodiment is described based on FIG. 16.

In this example, 3 sets of power sources 241, 242 and 243 and 3 sets of IC 251, 252 and 253 such as CPU are respectively made pairs and mutually connected. Namely, power source 241 and IC 251 are connected, power source 242 and IC 252 are connected, and power source 243 and IC 253 are connected.

Next, terminal electrode 231 connected to segmented conductor 221 of multilayer capacitor 210 and terminal electrode 234 connected to segmented conductor 224 are respectively connected between power source 241 and IC 251. Further, terminal electrode 232 connected to segmented conductor 222 and terminal electrode 235 connected to segmented conductor 225 are respectively connected between power source 242 and IC 252. Further, terminal electrode 233 connected to segmented conductor 223 and terminal electrode 236 connected to segmented conductor 226 are respectively connected between power source 243 and IC 253. On the other, terminal electrode 237 connected to internal electrode 227 and terminal electrode 238 connected to internal conductor 228 are respectively grounded.

Considering above, with this example, for instance, terminal electrodes 231 to 236 are made mutually homopolar wherein it is plus and terminal electrodes 237 to 238 are made mutually homopolar and are minas, substantial decreasing of ESL is attempted and that voltage fluctuation of power sources 241, 242 and 243 can be suppressed.

EXAMPLE 2

Next, by using network analyzer, S21 characteristic of S parameter of each sample below was measured and attenuation characteristics of each sample was respectively found. First, content of each sample will be described. Namely, multilayer capacitor comprising two terminals shown in FIG. 21, which is a general capacitor, is made comparative example 1, and multilayer capacitor comprising many terminals as in the embodiment shown in FIG. 14 is made example 2.

Figure 17:
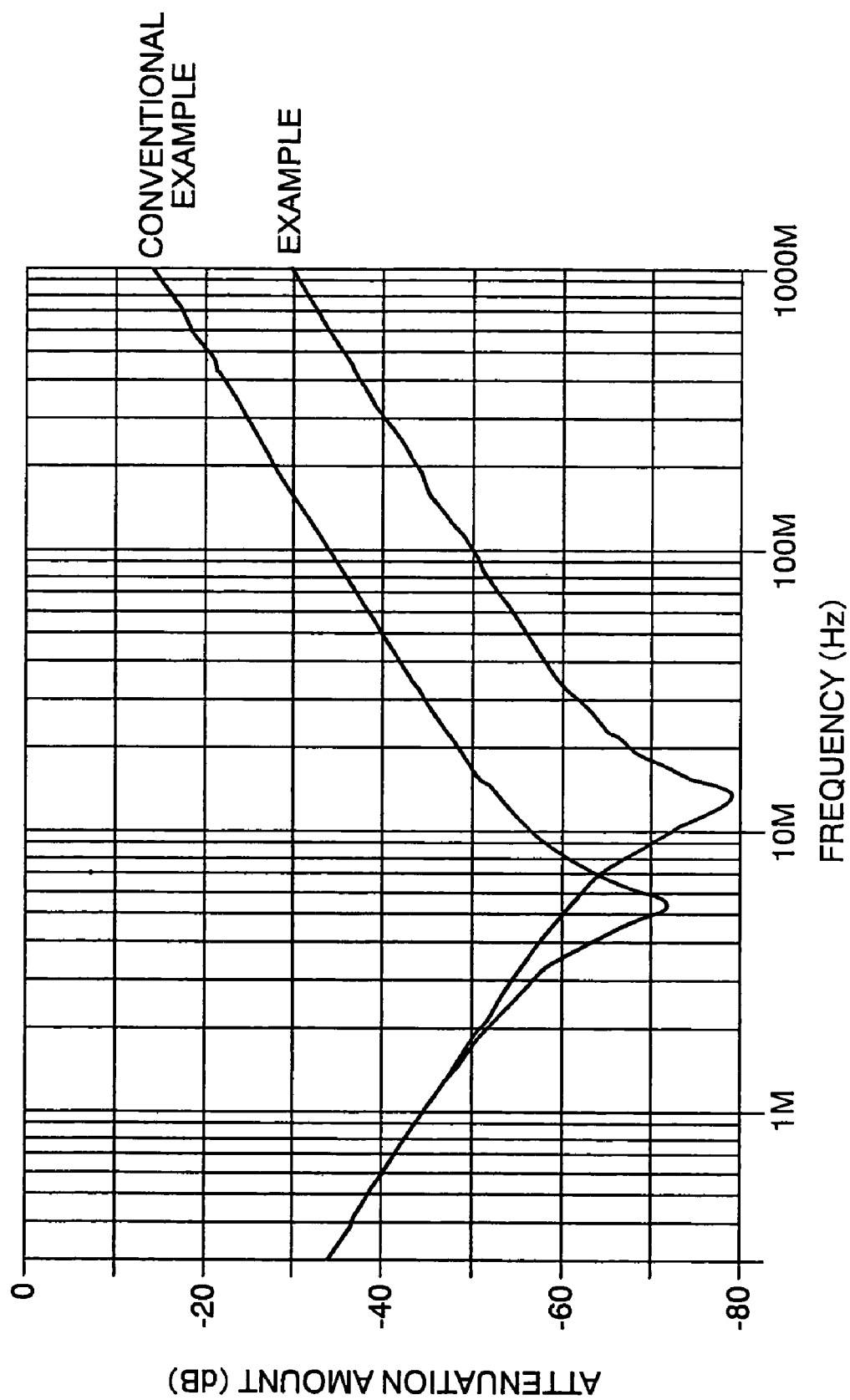
FIG. 17 is a graph showing attenuation characteristics of capacitor of example and comparative example of the invention.
Figure 18:
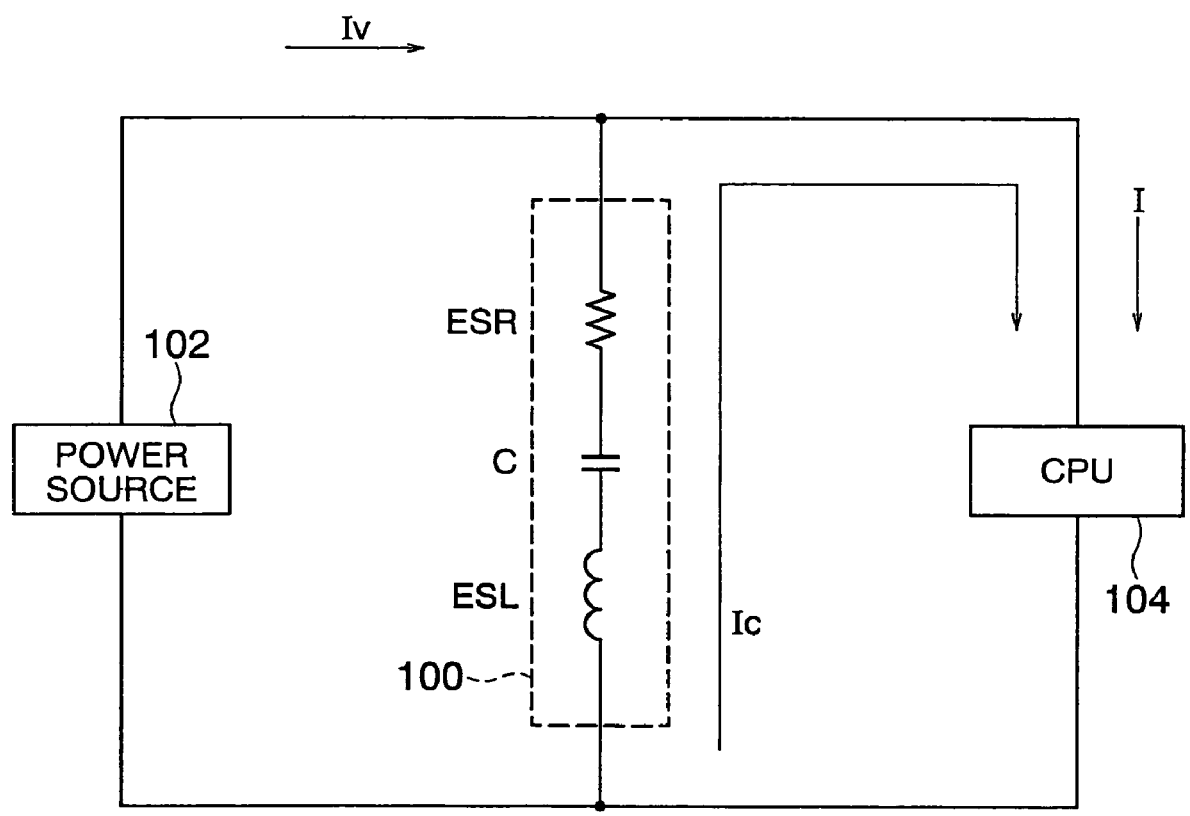
FIG. 18 is a circuit diagram using conventional example of multilayer capacitor.
Figure 19:
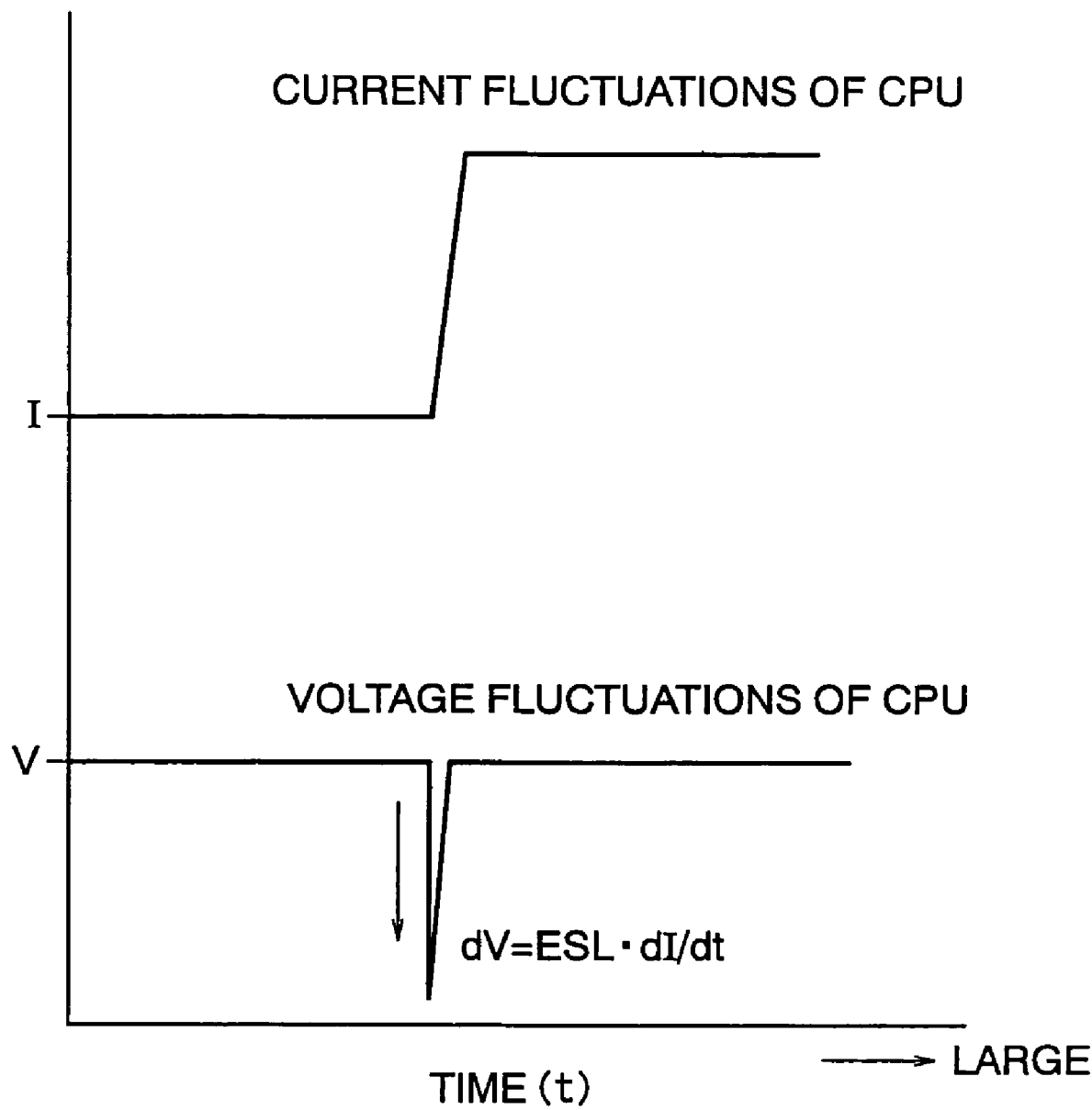
FIG. 19 is a graph showing relations between current fluctuations and voltage fluctuations in circuit shown in FIG. 18.

Here, a constant of equivalent circuit, wherein a measured value of the attenuation characteristic and attenuation amount of the equivalent circuit are the same, were measured. From the data of the attenuation characteristics of each sample shown in FIG. 17, it can be noticed that the attenuation amount of Example 2 at a high frequency range of at least 20 MHz is increasing in the amount of approximately 15 dB compared to the same in comparative example 1. From the data, an improvement of high frequency characteristics in example 2 can be seen.

On the other, calculated ESL shown in table 2 is substantially reduced in Example 2 compared to the same in comparative example 1. Therefore, it was confirmed that table 2 also proves the effect of the invention.

TABLE 2

|  | C (µF) | ESR (mΩ) | ESL (pH) |
| --- | --- | --- | --- |
| Comp. Ex. 1 | 1.038 | 6.3 | 825.2 |
| Ex. 2 | 1.062 | 2.8 | 143.4 |

In the table 2, C is electrostatic capacities and ESL is equivalent serial resistance. The size of each sample used here is, as shown in FIGS. 21 and 14, when the distance between side surfaces of dielectric body where a pair of internal conductors are led out is L and the distance between side surfaces that lie at right angles with the side surfaces of dielectric body where a pair of internal conductors are led out is W, the sizes of each samples used are as following. In comparative example 1, L=2.0 mm and W=1.25 mm and in example 2, L=1.6 mm and W=1.6 mm.

Further, multilayer capacitor 210 according to the above embodiment is considered to have two sets, each set having 4 layers, and 8 layers in all. However, the number of layers is not limited to this and it can further be increased. For instance, the number of layers may be several decades or several hundreds. According to the above-mentioned embodiment, structures wherein 3 segmented conductors are arranged in a plane are shown, though each may have 2 or 4 segmented conductors. The present invention is not limited to the above-mentioned embodiment and it may alternately change in different ways within the scope of the invention.

The invention claimed is:

1. A multilayer capacitor wherein a plural number of internal conductors are respectively disposed between dielectric sheets in dielectric body formed by laminating a plural number of dielectric sheets, the internal conductors comprising:

at least a pair of first internal conductors respectively led out toward two facing side surfaces of dielectric sheets, and at least a pair of second internal conductors respectively led out toward two facing side surfaces of the dielectric sheets different from the two facing side surfaces where said first internal conductors are led out, wherein at least one of the pair of the second internal conductors is arranged between a pair of the first internal conductors intervening said dielectric sheets, at least one of the pair of the first internal conductors is arranged between a pair of the second internal conductors intervening said dielectric sheets, at least a pair of first terminal electrodes arranged at two facing side surfaces of the dielectric body and respectively connected to a pair of the first internal conductors, and a pair of second terminal electrodes arranged at two facing side surfaces of the dielectric body, different from the two facing side surfaces where said first internal conductors are arranged, and respectively connected to a pair of the second internal conductors, at least one of the first internal conductor and the second internal conductor comprises two segmented conductors alternately led out toward two facing side surfaces of the dielectric body segmented in the way that the conductors extend in parallel form, and mutually adjoining segmented conductors arranged in the same plane are respectively connected to the terminal electrodes respectively arranged at two facing side surfaces.

2. The multilayer capacitor as set forth in claim 1, wherein lead parts respectively connected to the first terminal electrode and the second terminal electrode are formed in the first internal conductor and the second internal conductor.

3. The multilayer capacitor as set forth in claim 1, wherein width of the lead parts arranged in a plane facing each other are substantially the same.

4. The multilayer capacitor as set forth in claim 1, wherein a planar shape of the segmented conductor is rectangle, triangle, or trapezoid.

5. The multilayer capacitor as set forth in claim 1, wherein the dielectric body is in a shape of rectangular parallelepiped.

6. The multilayer capacitor as set forth in claim 1, wherein plural pairs of the first and the second internal conductors are arranged in the laminated direction respectively in the dielectric body.

7. A multilayer capacitor wherein a plural number of internal conductors are respectively disposed between dielectric sheets in dielectric body formed by laminating a plural number of dielectric sheets, the internal conductors comprising:

at least a pair of first internal conductors respectively led out toward two facing side surfaces of dielectric sheets, and at least a pair of second internal conductors respectively led out toward two facing side surfaces of the dielectric sheets different from the two facing side surfaces where said first internal conductors are led out, wherein at least one of the pair of the second internal conductors is arranged between a pair of the first internal conductors intervening said dielectric sheets, at least one of the pair of the first internal conductors is arranged between a pair of the second internal conductors intervening said dielectric sheets, the at least one of the pair of the first internal conductors comprises two segmented conductors wherein the conductors are segmented to extend mutually in a row and are alternately let out toward two facing side surfaces of dielectric body, the at least one of the pair of the first internal conductors mutually adjoining in the laminated direction disposing the second internal conductor in between are arranged to superpose upon each other when observed from planar view, the segmented conductors that superpose upon each other when observed from planar view are alternately led out toward the opposite directions, and mutually adjoining segmented conductors arranged in the same plane are respectively connected to the terminal electrodes respectively arranged at two facing side surfaces.

8. The multilayer capacitor as set forth in claim 7, wherein the second internal conductors are not segmented.

* * * * *